United States Patent
Mizutani

(10) Patent No.: US 10,387,084 B2
(45) Date of Patent: Aug. 20, 2019

(54) CONTROL METHOD FOR INFORMATION PROCESSING APPARATUS AND INFORMATION PROCESSING APPARATUS

(71) Applicant: CANON KABUSHIKI KAISHA, Tokyo (JP)

(72) Inventor: Keisuke Mizutani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/937,704

(22) Filed: Mar. 27, 2018

(65) Prior Publication Data

US 2018/0285025 A1    Oct. 4, 2018

(30) Foreign Application Priority Data

Mar. 31, 2017  (JP) .................................. 2017-072370

(51) Int. Cl.
*G06F 3/12* (2006.01)
*H04N 1/00* (2006.01)

(52) U.S. Cl.
CPC ............ *G06F 3/121* (2013.01); *G06F 3/1235* (2013.01); *G06F 3/1292* (2013.01); *H04N 1/00* (2013.01)

(58) Field of Classification Search
CPC ....... G06F 3/121; G06F 3/1292; G06F 3/1235
USPC ....................................................... 358/1.14
See application file for complete search history.

(56) References Cited

U.S. PATENT DOCUMENTS

2014/0340701 A1 * 11/2014 Okamura ................ G06F 3/121
358/1.14

FOREIGN PATENT DOCUMENTS

| JP | 2010-98717 A | 4/2010 |
|---|---|---|
| JP | 2016-149721 A | 8/2016 |
| JP | 2017-017594 A | 1/2017 |

* cited by examiner

*Primary Examiner* — Saeid Ebrahimi Dehkordy
(74) *Attorney, Agent, or Firm* — Canon U.S.A., Inc. IP Division

(57) ABSTRACT

A control method for an information processing apparatus that performs wireless communication with a communication apparatus includes receiving, via a communication in a state in which pairing between the communication apparatus and the information processing apparatus is complete, predetermined information transmitted from the communication apparatus in a case where the communication apparatus is in a predetermined error state, and causes a display unit to display a screen for eliminating an error occurring in the communication apparatus, wherein, in a case where the pairing is complete, a screen including first information for eliminating the predetermined error state is displayed based on the received predetermined information, and, in a case where the pairing is not complete, a screen including second information different from the first information is displayed.

24 Claims, 14 Drawing Sheets

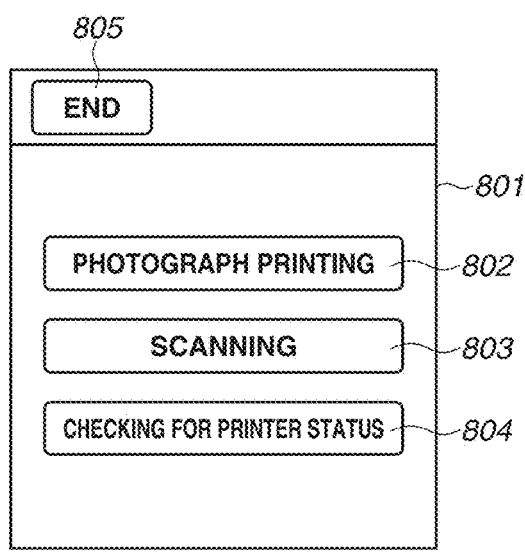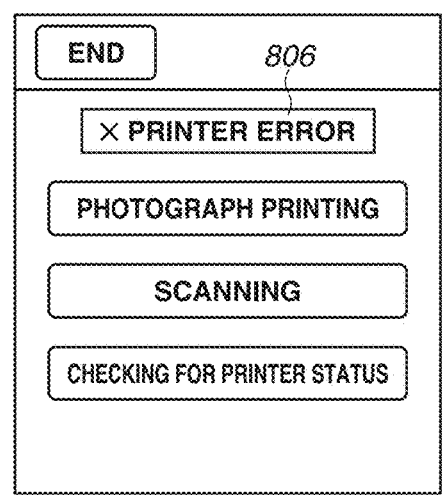

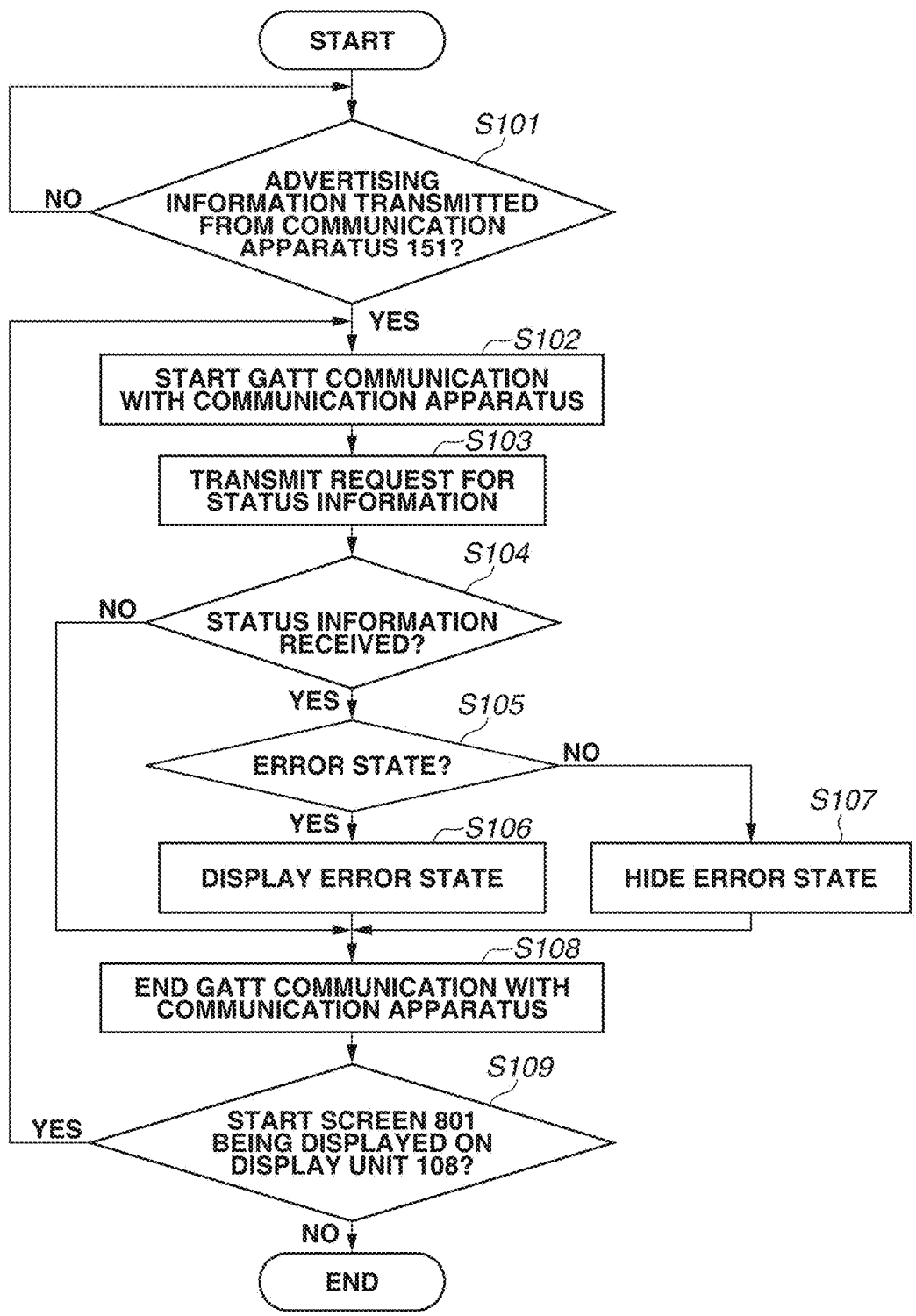

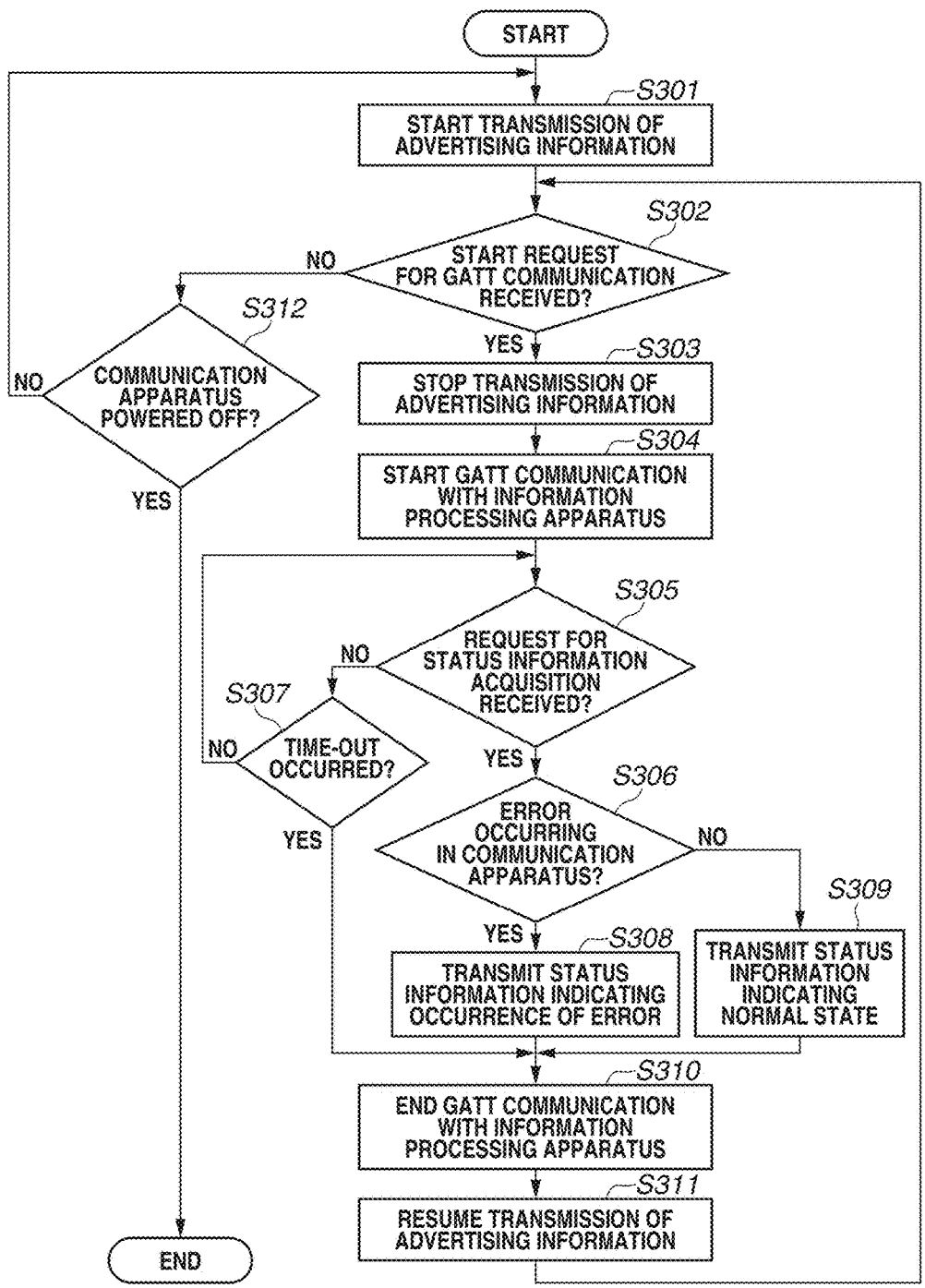

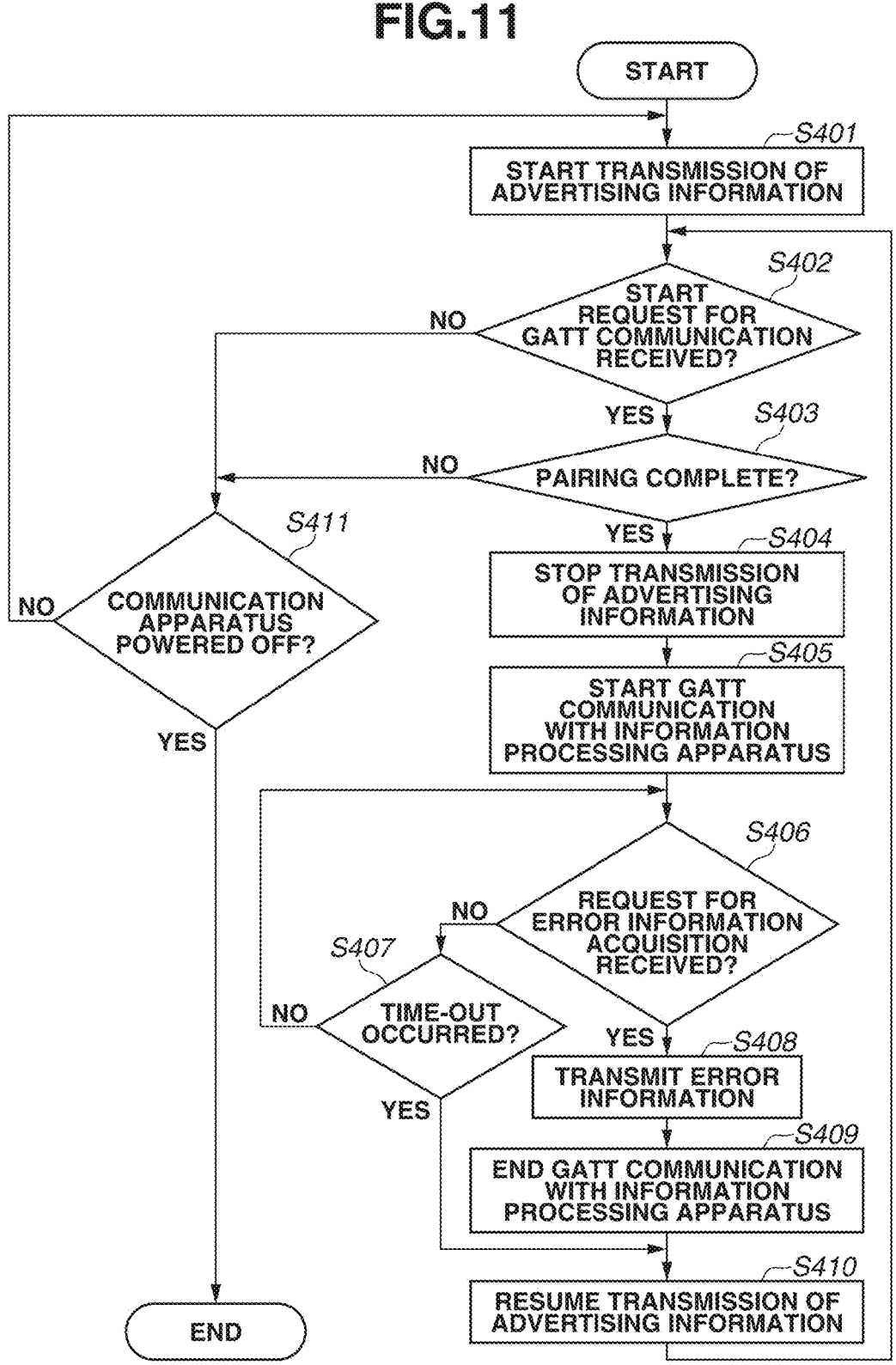

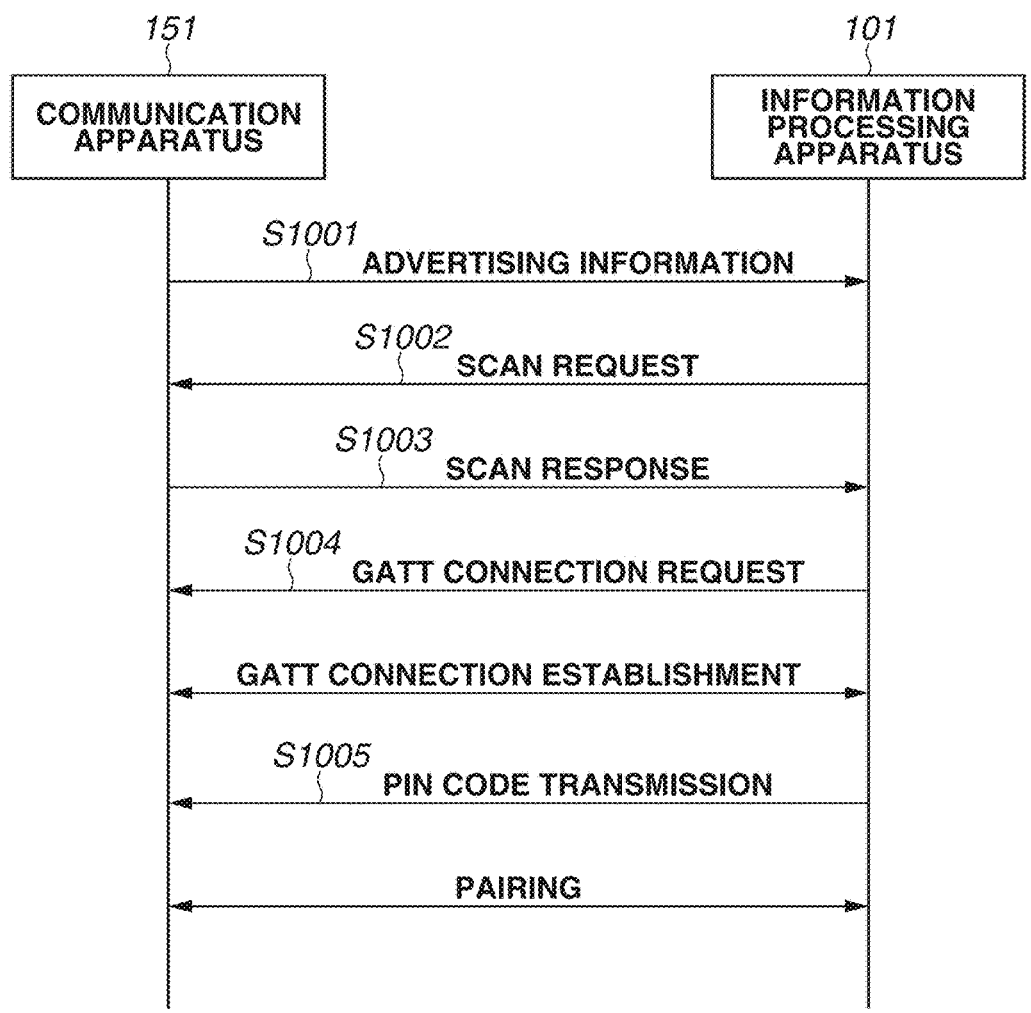

CONTROL METHOD FOR INFORMATION PROCESSING APPARATUS AND INFORMATION PROCESSING APPARATUS

BACKGROUND

Field

Aspects of the present disclosure generally relate to a control method for an information processing apparatus, an information processing apparatus, and a communication system.

Description of the Related Art

In a communication apparatus, such as a printer, that communicates with an information processing apparatus, in a case where an error such as a shortage of ink or a paper jam has occurred, to prompt a user to eliminate an error state of the communication apparatus, a notification of error information can be indicated on, for example, a display screen of the communication apparatus. Japanese Patent Application Laid-Open No. 2010-98717 discusses a method for notifying an information processing apparatus of information about, for example, an error occurring in a printer.

In a configuration discussed in Japanese Patent Application Laid-Open No. 2010-98717, after receiving a print job transmitted from the information processing apparatus, the printer notifies the information processing apparatus of, for example, an error occurring in relation to the print job via a wireless communication that meets the same standard as that employed for transmission of the print job. With this configuration, information is indicated on a display screen of the printer body, as well notified to the information processing apparatus, resulting in improved user convenience. However, In the case of the configuration discussed in Japanese Patent Application Laid-Open No. 2010-98717, control of a notification content that is based on a communication condition can sometimes not be always sufficient.

SUMMARY OF THE INVENTION

According to an aspect of the present disclosure, a control method for an information processing apparatus that performs wireless communication with a communication apparatus includes receiving, via an established connection in a state in which pairing between the communication apparatus and the information processing apparatus is complete, predetermined information transmitted from the communication apparatus in a case where the communication apparatus is in a predetermined error state, and causing a display unit to display a screen for eliminating an error occurring in the communication apparatus, wherein, in a case where pairing between the information processing apparatus and the communication apparatus is complete, a screen including first information for eliminating the predetermined error state is displayed based on the received predetermined information, and, wherein, in a case where pairing between the information processing apparatus and the communication apparatus is not complete, a screen including second information different from the first information is displayed.

Further features will become apparent from the following description of exemplary embodiments with reference to the attached drawings.

BRIEF DESCRIPTION OF THE DRAWINGS

FIGS. 5A and 5B are schematic diagrams each illustrating a display screen displayed at the time of activation of a printing application.

FIG. 7 is a flowchart illustrating status information acquisition processing which the information processing apparatus performs in the first exemplary embodiment.

FIG. 10 is a flowchart illustrating processing which the communication apparatus performs when transmitting status information in the first exemplary embodiment.

FIG. 11 is a flowchart illustrating processing which the communication apparatus performs when transmitting error information in the first exemplary embodiment.

FIG. 13 is a sequence diagram illustrating processing in which the information processing apparatus and the communication apparatus perform pairing.

DESCRIPTION OF THE EMBODIMENTS

Various exemplary embodiments, features, and aspects of the invention will be described in detail below with reference to the drawings. In this regard, alterations or improvements to the exemplary embodiments described below as appropriate based on ordinary knowledge of a person skilled in the art fall within the scope of the invention.

An information processing apparatus and a communication apparatus that are included in a communication system according to an exemplary embodiment are described. In the present exemplary embodiment, an example of the information processing apparatus is a smartphone, and an example of the communication apparatus is a printer. The present exemplary embodiment is not limited to a smartphone and can be applied to various other devices such as a portable terminal, a notebook personal computer (PC), a tablet terminal, a personal digital assistant (PDA), and a digital camera. The present exemplary embodiment is also not limited to a printer, can be applied to various types of printers, such as an inkjet printer, a full-color laser beam printer, and a monochromatic printer. In addition, the communication apparatus can be, for example, a copying machine, a facsimile apparatus, a portable terminal, a smartphone, a notebook PC, a tablet terminal, a PDA, a digital camera, a music playback device, and a television set. Additionally, the communication apparatus can also be a multifunction peripheral, which includes a plurality of functions such as copying function, a facsimile (FAX) function, and a printing function.

<Configuration of Information Processing Apparatus>

Figure 1:
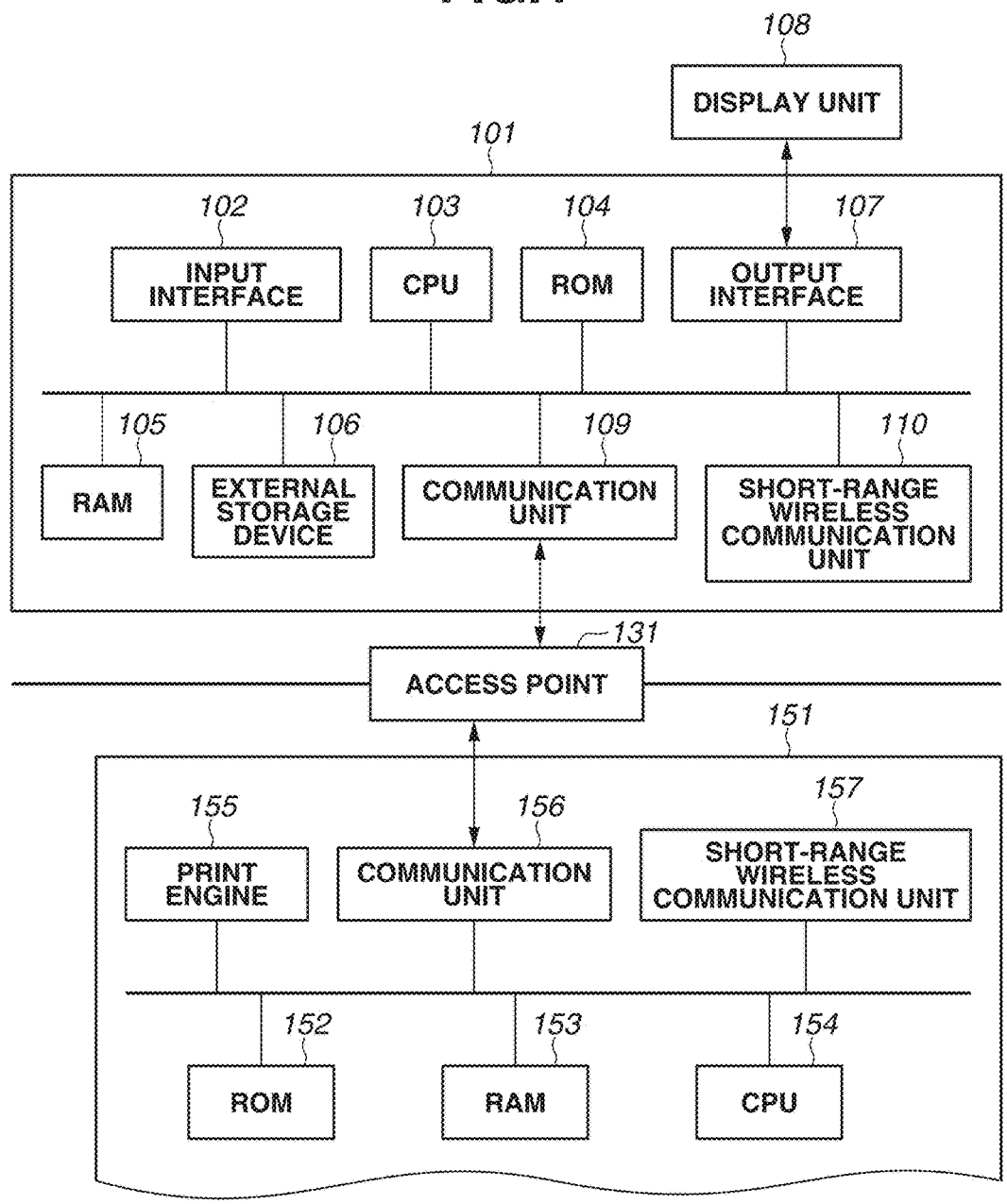
FIG. 1 is a block diagram illustrating configurations of an information processing apparatus and a communication apparatus according to a first exemplary embodiment.

First, configurations of an information processing apparatus and a communication apparatus, which performs wireless communication with the information processing apparatus, in the present exemplary embodiment, are described with reference to the block diagram of FIG. 1. While, in the present exemplary embodiment, the configurations illustrated in FIG. 1 are described as an example, the functions of the respective apparatuses should not be construed to be limited to those illustrated in FIG. 1.

The information processing apparatus 101 includes an input interface 102, a central processing unit (CPU) 103, a read-only memory (ROM) 104, a random access memory (RAM) 105, an external storage device 106, an output interface 107, a display unit 108, a communication unit 109, and a short-range wireless communication unit 110. These units are connected to each other via a system bus.

The input interface 102 is an interface that receives inputting of data or an instruction for operations from a user via an operation unit (not illustrated) such as a physical keyboard, buttons, or a touch panel. The display unit 108 described below and the operation unit can be integrated at least in part, and, for example, a configuration in which outputting of a screen and receiving of an operation from the user are performed via the same screen can also be employed.

The CPU 103, which is a system control unit, controls the information processing apparatus 101 by performing, for example, execution of a program and activation of hardware.

The ROM 104 stores fixed data such as control programs, table data, and an embedded operating system (hereinafter referred to as an "OS") program, which the CPU 103 executes. In the present exemplary embodiment, the control programs stored in the ROM 104 perform software execution control, such as scheduling, task switching, and interrupt processing, under the control of the embedded OS stored in the ROM 104.

The RAM 105 is, for example, a static random access memory (SRAM) or a dynamic RAM (DRAM), which requires a backup power source. The RAM 105 can be configured to retain data with a primary battery for data backup (not illustrated). In that case, the RAM 105 can store important data such as program control variables without volatilizing the data. Memory areas for storing, for example, setting information about the information processing apparatus 101 and management data for the information processing apparatus 101 are allocated in the RAM 105. The RAM 105 is also used as a main memory and a work memory for the CPU 103.

The external storage device 106 stores, for example, an application for providing a printing execution function and a printing information generation program for generating printing information that can be interpreted by the communication apparatus 151. The external storage device 106 stores various programs, such as an information transmission and reception control program for performing transmission and reception with respect to the communication apparatus 151, which is connected via the communication unit 109, and various pieces of information to be used by these programs.

The output interface 107 is an interface that performs control for the display unit 108 to perform displaying of data or notification of the status of the information processing apparatus 101.

The display unit 108, which includes, for example, light-emitting diodes (LEDs) or a liquid crystal display (LCD), performs displaying of data or notification of the status of the information processing apparatus 101. A software keyboard, which includes keys such as numerical value input keys, a mode setting key, a determination key, a cancel key, and a power key, can be installed on the display unit 108, so that inputting from the user can be received via the display unit 108.

The communication unit 109 connects to an external apparatus, such as the communication apparatus 151, to perform data communication. The communication unit 109 can also connect to, for example, an access point (not illustrated) included in the communication apparatus 151. The communication unit 109 and the access point included in the communication apparatus 151 connecting to each other enable the information processing apparatus 101 and the communication apparatus 151 to perform wireless communication with each other. The communication unit 109 can directly communicate with the communication apparatus 151 via wireless communication or can communicate with the communication apparatus 151 via an external access point (an access point 131), which is present external to both the information processing apparatus 101 and the communication apparatus 151. Examples of the wireless communication method include Wi-Fi® and Bluetooth®. Examples of the access point 131 include a device such as a wireless local area network (LAN) router. In the present exemplary embodiment, a method in which the information processing apparatus 101 and the communication apparatus 151 directly connect to each other without via an external access point is referred to as a "direct connection method". A method in which the information processing apparatus 101 and the communication apparatus 151 directly connect to each other via an external access point is referred to as an "infrastructure connection method".

The short-range wireless communication unit 110 performs wireless communication at close range with an apparatus such as the communication apparatus 151 to perform data communication, and performs communication based on a communication method (communication standard) different from that employed for the communication unit 109. The short-range wireless communication unit 110 can connect to a short-range wireless communication unit 157 included in the communication apparatus 151. In the present exemplary embodiment, Bluetooth® Low Energy is used as the communication method employed for the short-range wireless communication unit 110. In other words, the short-range wireless communication unit 110 includes a Bluetooth® Low Energy unit (a Bluetooth® Low Energy communication module). The Bluetooth® Low Energy unit includes a microcomputer, which is a microprocessor to perform processing for wireless communication, and a wireless communication circuit, which performs transmission and reception of data via wireless communication. The microcomputer is equipped with a RAM and a flash memory. Near Field Communication (NFC) or Wi-Fi Aware™, for example, can be used as the communication method employed for the short-range wireless communication unit 110.

In the present exemplary embodiment, the information processing apparatus 101 is assumed to store a predetermined application in, for example, the ROM 104 or the external storage device 106. The predetermined application is, for example, an application program for transmitting, to the communication apparatus 151, a print job to cause the communication apparatus 151 to print, for example, image data or document data stored in the information processing apparatus 101. An application including such a function is hereinafter referred to as a "printing application". The printing application can include additional functions besides the printing function. For example, in a case where the communication apparatus 151 includes a scanning function, the printing application can include a function causing the communication apparatus 151 to scan an original set on the communication apparatus 151, and the printing application can include, for example, a function to perform other setting operations of the communication apparatus 151 and a function that checks the status of the communication apparatus 151. In other words, besides a print job, the printing application can include a function for transmitting a scanning job or a setting job to the communication apparatus 151. The predetermined application is not limited to the printing application, but can be an application program having a function other than printing.

<Configuration of Communication Apparatus>

The communication apparatus 151 includes, for example, a ROM 152, a RAM 153, a CPU 154, a print engine 155, a communication unit 156, and a short-range wireless communication unit 157. These units are connected to each other via a system bus.

The communication unit 156 includes an access point to connect to an external apparatus such as the information processing apparatus 101 as an access point incorporated in the communication apparatus 151. The access point can connect to the communication unit 109 of the information processing apparatus 101. The communication unit 156 can directly communicate with the information processing apparatus 101 via wireless communication, or can communicate with the information processing apparatus 101 via the access point 131. Examples of the communication method include Wi-Fi® and Bluetooth®. The communication unit 156 can include hardware functioning as an access point, or can operate as an access point according to software to cause the communication unit 156 to function as an access point.

The short-range wireless communication unit 157 performs wireless connection at close range with an apparatus such as the information processing apparatus 101. In the present exemplary embodiment, Bluetooth® Low Energy is used as the communication method employed for the short-range wireless communication unit 157. In other words, the short-range wireless communication unit 157 includes a Bluetooth® Low Energy unit (a Bluetooth® Low Energy communication module). The Bluetooth® Low Energy unit includes a microcomputer, which is a microprocessor to perform processing for wireless communication, and a wireless communication circuit, which performs transmission and reception of data via wireless communication. The microcomputer is equipped with a RAM and a flash memory. Near Field Communication (NFC) or Wi-Fi Aware™, for example, can be used as the communication method employed for the short-range wireless communication unit 157. The RAM 153 is configured with, for example, an SRAM or a DRAM, which requires a backup power source. Since data is retained with a primary battery for data backup (not illustrated), the RAM 153 can store important data such as program control variables without volatilizing the data. Memory areas for storing, for example, setting information about the communication apparatus 151 and management data for the communication apparatus 151 are allocated in the RAM 153. The RAM 153 is also used as a main memory and a work memory for the CPU 154, and acts as a receiving buffer for temporarily storing print information or various pieces of information received from, for example, the information processing apparatus 101.

The ROM 152 stores fixed data such as control programs, table data, and an OS program, which the CPU 154 executes. In the present exemplary embodiment, the control programs stored in the ROM 152 perform software execution control, such as scheduling, task switching, and interrupt processing, under the control of the embedded OS stored in the ROM 152.

The CPU 154, which is a system control unit, controls the communication apparatus 151 by performing, for example, execution of a program and activation of hardware.

The print engine 155 performs image formation on a recording medium, such as paper, using a recording agent, such as ink, based on information stored in the RAM 153 or a print job received from, for example, the information processing apparatus 101, thus outputting a printing result. At this time, a print job transmitted from, for example, the information processing apparatus 101 is large in transmitted data amount and requires high-speed communication, and, in the present exemplary embodiment, is, therefore, received via the communication unit 156, which performs more high-speed communication than the short-range wireless communication unit 157. Specifically, the information processing apparatus 101 and the communication apparatus 151 perform communication using a wireless LAN (Wi-Fi®), which enables more high-speed communication than Bluetooth® Low Energy, via the communication unit 109 and the communication unit 156, so that the information processing apparatus 101 can transmit a print job using the wireless LAN.

More specifically, the information processing apparatus 101 and the communication apparatus 151 exchange a communication protocol that is usable by both apparatuses via Bluetooth® Low Energy communication described below, so that the information processing apparatus 101 recognizes that a wireless LAN is usable. Then, the information processing apparatus 101 communicates information used for performing wireless LAN communication, such as information about an address or a service set identifier (SSID) for identifying a communication partner. This enables switching from Bluetooth® Low Energy communication to wireless LAN communication.

The communication apparatus 151 can enable a memory, such as an external hard disk drive (HDD) or Secure Digital (SD) card, to be attached thereto as an optional device, and information to be stored in the communication apparatus 151 can be stored in the memory.

<Communication Using Bluetooth® Low Energy>

In the description of the present exemplary embodiment, the short-range wireless communication unit 110 and the short-range wireless communication unit 157 are assumed to perform communication via Bluetooth® Low Energy. In the present exemplary embodiment, the short-range wireless communication unit 157 of the communication apparatus 151 functions as an advertiser (or a slave) that broadcasts advertising information described below, and the short-range wireless communication unit 110 of the information processing apparatus 101 functions as a scanner (or a master) that receives the advertising information.

Processing for transmission of advertising information in the Bluetooth® Low Energy standard and reception of a Bluetooth® Low Energy connection request (a connection request in the Generic Attribute Profile (GATT)) will be described. In the present exemplary embodiment, the information processing apparatus 101 operates as a master apparatus, and the communication apparatus 151 operates as a slave apparatus. While, processing sharing of the information processing apparatus 101 and the communication apparatus 151 is set as described above, the present exemplary embodiment is not limited to this sharing configuration, and another configurations can be employed.

In Bluetooth® Low Energy communication, the short-range wireless communication unit 157 performs communication with a frequency band of 2.4 gigahertz (GHz) divided into 40 channels (channel 0 to channel 39). Out of these channels, the short-range wireless communication unit 157 uses channel 37 to channel 39 for transmission of advertising information and reception of a Bluetooth® Low Energy connection request, and uses channel 0 to channel 36 for data communication performed after Bluetooth® Low Energy connection.

Figure 2:
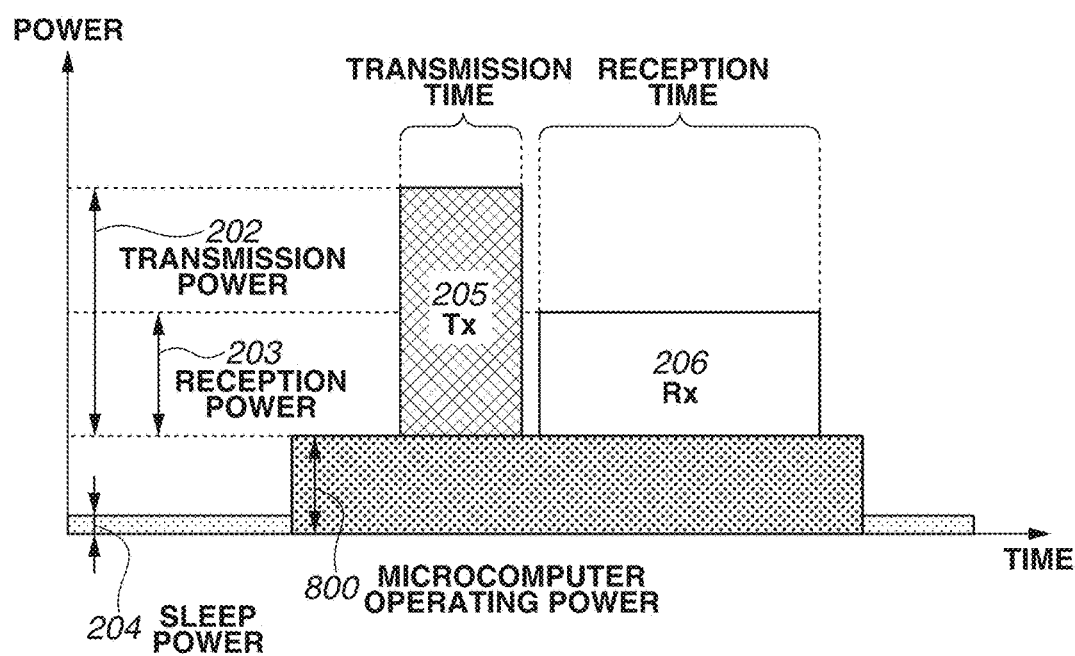
FIG. 2 is a diagram used to illustrate processing for broadcasting of advertising information and processing for reception of connection request information.

FIG. 2 is a diagram used to illustrate processing for broadcasting of advertising information and reception of connection request information. In FIG. 2, the ordinate axis represents power consumption of the short-range wireless communication unit 157 and the abscissa axis represents time, and power consumption required for transmission of advertising information using one channel is indicated individually for each processing. Tx 205 represents overall power consumption in processing for broadcasting advertising information (hereinafter referred to as "transmission processing"). Rx 206 represents overall power consumption in processing for keeping a receiving device for receiving a Bluetooth® Low Energy connection request enabled (hereinafter referred to as "reception processing"). Transmission power 202 represents instantaneous power consumption caused by the transmission processing. Reception power 203 represents instantaneous power consumption caused by the reception processing. Additionally, microcomputer operating power 800 represents instantaneous power consumption caused by a microcomputer included in the short-range wireless communication unit 157 operating. The microcomputer also operates before, after, and between the Tx 205 and the Rx 206 to perform execution or stopping of the transmission processing or the reception processing since the microcomputer needs to be activated in advance. In a case where transmission of advertising information is performed with a plurality of channels, power consumption increases in conjunction with the number of channels used to perform transmission of advertising information. During a period in which the microcomputer is not operating and the short-range wireless communication unit 157 is in a power saving state, sleep power 204 serves as instantaneous power consumption of the short-range wireless communication unit 157. In this way, after performing the transmission processing using a predetermined channel, the short-range wireless communication unit 157 performs the reception processing using the same channel for a given time, thus waiting for a Bluetooth® Low Energy connection request to be transmitted from the information processing apparatus 101.

Figure 3:
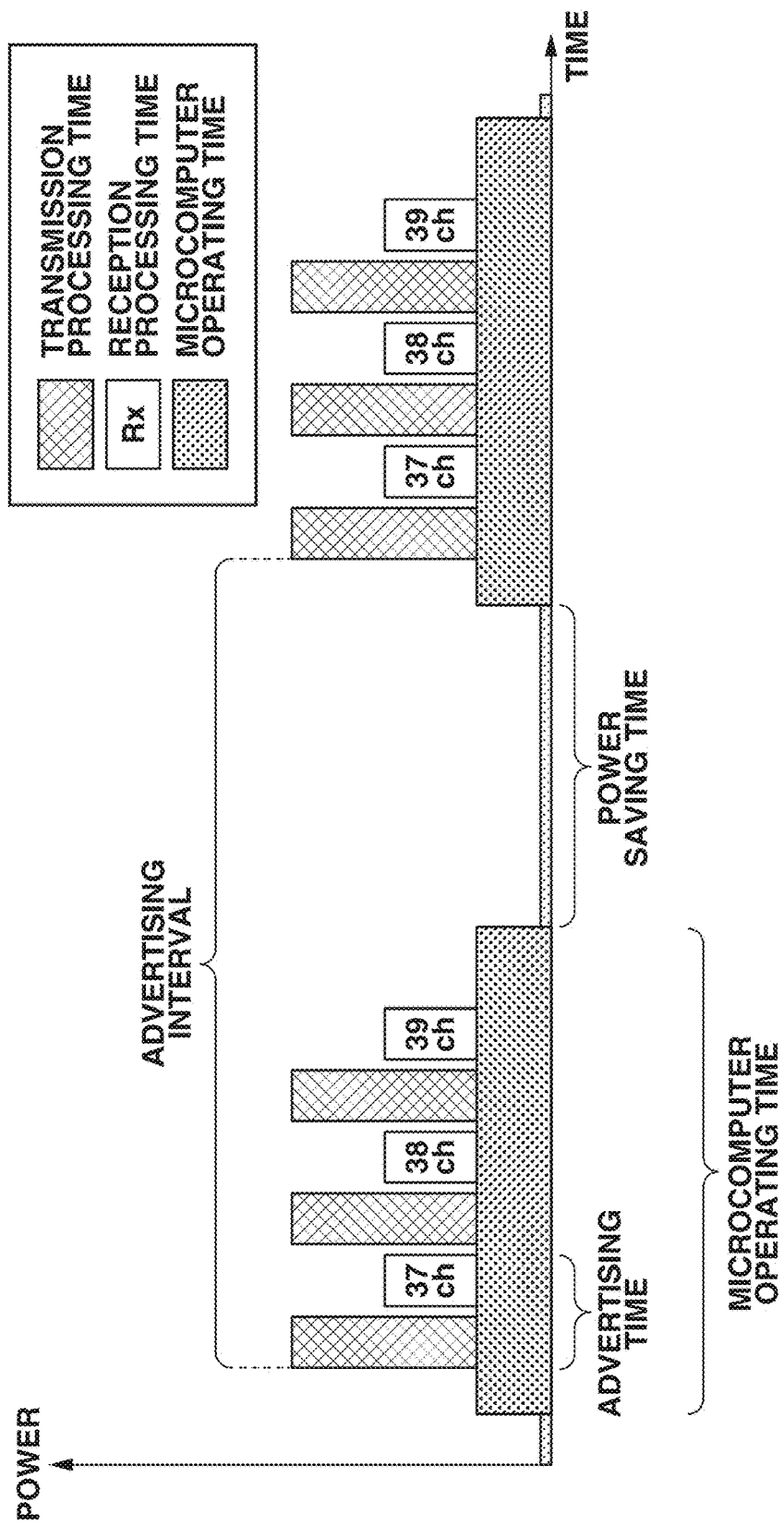
FIG. 3 is a diagram used to illustrate advertising in Bluetooth® Low Energy (BLE).

FIG. 3 is a diagram used to illustrate advertising in Bluetooth® Low Energy. As illustrated in FIG. 3, after repeating the transmission processing and reception processing of advertising information three times with respective different channels, the short-range wireless communication unit 157 stops operation of the microcomputer and enters into a power saving state for a given time. Hereinafter, a combination of transmission processing and reception processing of advertising information with a predetermined channel is referred to as "advertising". A time interval to transmit advertising information with a predetermined channel, in other words, a time interval from the time of transmitting advertising information with a given channel to the time of transmitting next advertising information with the same channel, is referred to as an "advertising interval". The number of times of advertising that is repeated from the time of performing the first advertising to the time of entering into a power saving state can be optionally changed as long as it is three or less.

Figure 4:
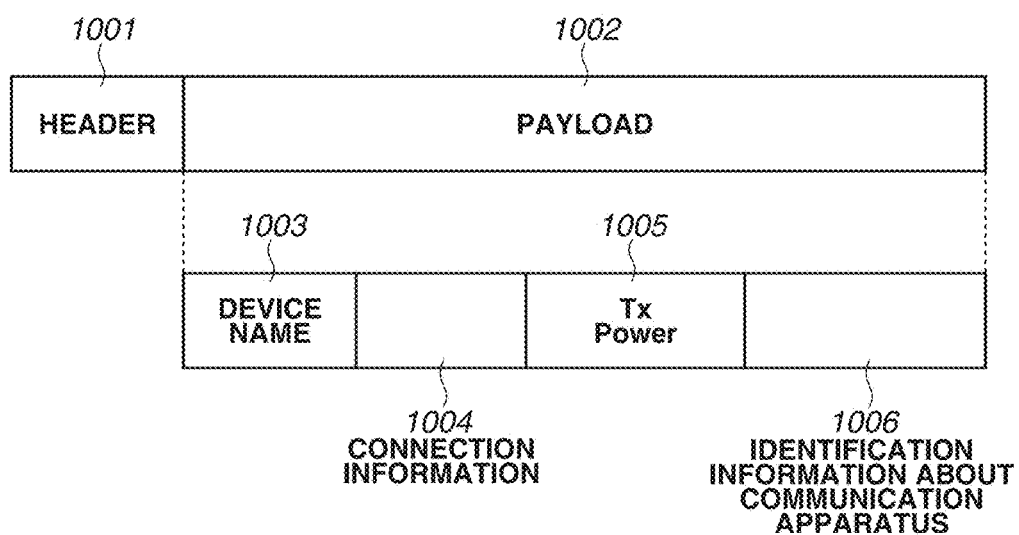
FIG. 4 is a diagram illustrating a structure of advertising information.

FIG. 4 illustrates an example of a structure of advertising information that the short-range wireless communication unit 157 broadcasts around the communication apparatus 151. When supplying of power is started, the short-range wireless communication unit 157 performs initialization processing and then enters into an advertising state. When entering into the advertising state, the short-range wireless communication unit 157 periodically broadcasts advertising information around the communication apparatus 151 based on the advertising interval.

In the present exemplary embodiment, the advertising information (an advertising signal) is includes a header 1001 and a payload 1002. The header 1001 is a region in which to store, for example, information about a protocol data unit (PDU) type and the size of the payload 1002. In a case where the PDU type is ADV_IND or ADV_SCAN_IND, the short-range wireless communication unit 110 can issue a scan request (SCAN_REQ) to the short-range wireless communication unit 157 (see FIG. 13). The payload 1002 is used to store a device name 1003 serving as identification information, installed profile information, and connection information 1004 used for Bluetooth® Low Energy connection with the communication apparatus 151. The payload 1002 is used to store information about, for example, transmission power (Tx power) 1005 required for advertising information. The payload 1002 can be used to store, as identification information 1006 about a communication apparatus, for example, media access control (MAC) address of the communication apparatus, SSID (IP address) of an access point included in the communication apparatus, information about a port used for printing, information indicating a specific printing service, information concerning functions and hardware included in the communication apparatus 151, and a password.

In the present exemplary embodiment, when the communication apparatus 151 is powered on, the short-range wireless communication unit 157 is assumed to enter into an advertising state, thus starting transmission of advertising information. However, the timing at which the short-range wireless communication unit 157 starts transmission of advertising information is not limited to the above-mentioned configuration, but can be, for example, the timing at which a predetermined operation for enabling a Bluetooth® Low Energy function is performed.

The information processing apparatus 101 can recognize the presence of the communication apparatus 151 by receiving the advertising information. Then, the information processing apparatus 101 can perform Generic Attribute Profile (GATT) communication with the communication apparatus 151 by transmitting a connection request to the communication apparatus 151. GATT is a profile used to manage reading and writing (transmission and reception) of information in the Bluetooth® Low Energy standard.

In the present exemplary embodiment, authentication is performed between the information processing apparatus 101 and the communication apparatus 151, and pairing processing for performing reading and writing of data in a state in which security is more ensured is performed via GATT communication. In a state in which pairing is not yet performed between the information processing apparatus 101 and the communication apparatus 151, the communication apparatus 151 is assumed to be configured not to enable reading and writing of specific information (high-confidentiality information) by GATT communication. In other words, in a state in which pairing is not complete, execution of reading and writing is enabled with respect to a region for which pairing is not required, but execution of reading and writing is not enabled with respect to a region for which pairing is required. In a state in which pairing is complete, execution of reading and writing is enabled with respect to both the region for which pairing is required and the region for which pairing is not required. With this configuration employed, it is possible to prevent such a phenomenon that, when the information processing apparatus 101 and the communication apparatus 151 perform communication with each other in a state in which pairing is not yet performed, for example, high-confidentiality information retained by the communication apparatus 151 is improperly acquired by the information processing apparatus 101, which does not yet perform pairing. In the present exemplary embodiment, it is assumed that there is GATT communication that is enabled in a state in which pairing is not yet performed and GATT communication that is not allowed in a state in which pairing is not yet performed. Low-confidentiality information is enabled to be communicated via GATT communication that is enabled in a state in which pairing is not yet performed, so that convenience of communication can be improved. High-confidentiality information is enabled to be communicated only via GATT communication that is not enabled in a state in which pairing is not yet performed, so that security of communication can be improved.

Details of pairing processing are described with use of FIG. 13. FIG. 13 is a sequence diagram illustrating processing performed from the time of transmission of advertising information to the time of pairing.

In step S1001, the communication apparatus 151, which is in a powered-on state, performs transmission of advertising information (first advertising information). The payload of the first advertising information includes information indicating an IP address of the printer, a port used for printing, and a specific printing service and information concerning transmission power required for the advertising information.

In step S1002, upon receiving the first advertising information, the information processing apparatus 101 transmits a scan request to the communication apparatus 151. Specifically, in a case where the printing application is activated in the information processing apparatus 101 and an initial screen (a home screen) provided by the printing application is displayed on the display unit 108, searching for the first advertising information is started and a scan request is transmitted. The scan request is transmitted based on information included in the header contained in the first advertising information. Specifically, in a case where the PDU type is ADV_IND or ADV_SCAN_IND, the short-range wireless communication unit 110 can issue a scan request (SCAN_REQ) to the short-range wireless communication unit 157.

In step S1003, the communication apparatus 151 transmits a scan response. The scan response information includes a structure essentially similar to the advertising information, and is, hereinafter referred to as "second advertising information". The payload of the second advertising information includes identification information (universally unique identifier (UUID)) about the communication apparatus 151 and information concerning functions and hardware included in the communication apparatus 151. The PDU type included in the header of the second advertising information is SCAN_RSP.

In the case of such a configuration, for example, the printing application is designed to perform handling of the second advertising information. In the following description, the advertising information that the printing application performs handling of is assumed to be the second advertising information.

In step S1004, upon receiving the second advertising information, the information processing apparatus 101 transmits a Bluetooth® Low Energy connection request (CONNECT_REQ) to an apparatus that transmitted the second advertising information (here, the communication apparatus 151). This connection request brings about connection establishment of GATT between the information processing apparatus 101 and the communication apparatus 151.

Figure 6A:
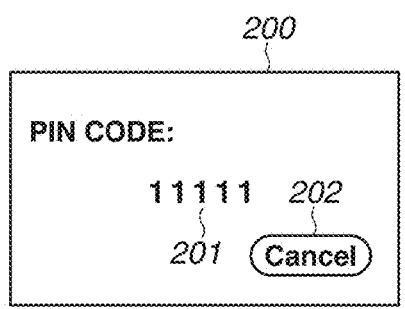
FIGS. 6A and 6B are schematic diagrams each illustrating a setting screen displayed during pairing processing.

In a case where pairing with the communication apparatus 151 is not yet completed, the information processing apparatus 101 displays, on the display unit 108, a screen prompting the user to perform pairing. Then, when an instruction for execution of pairing is issued by the user, the information processing apparatus 101 transmits a pairing request to the communication apparatus 151 via communication based on the Security Manager Protocol. Until pairing is completed, communications between the apparatuses are assumed to be performed based on the Security Manager Protocol. Upon receiving the pairing request, the communication apparatus 151 displays, on a display unit thereof, a personal identification number (PIN) code display screen 200, such as that illustrated in FIG. 6A. A PIN code 201 and a Cancel button 202 for canceling pairing processing are displayed on the PIN code display screen 200. A pairing start processing method is not limited to this method. Specifically, an instruction for reading a pairing-required region "dummy data for pairing start trigger" is executed based on a program of the printing application. However, since this stage is in a state in which pairing is not complete, when detecting that a read error has been returned from the communication apparatus 151, the information processing apparatus 101 transmits a pairing request. Upon receiving the pairing request, the communication apparatus 151 transmits a pairing response. Upon receiving the pairing response, the information processing apparatus 101 displays a PIN code input screen.

Figure 6B:
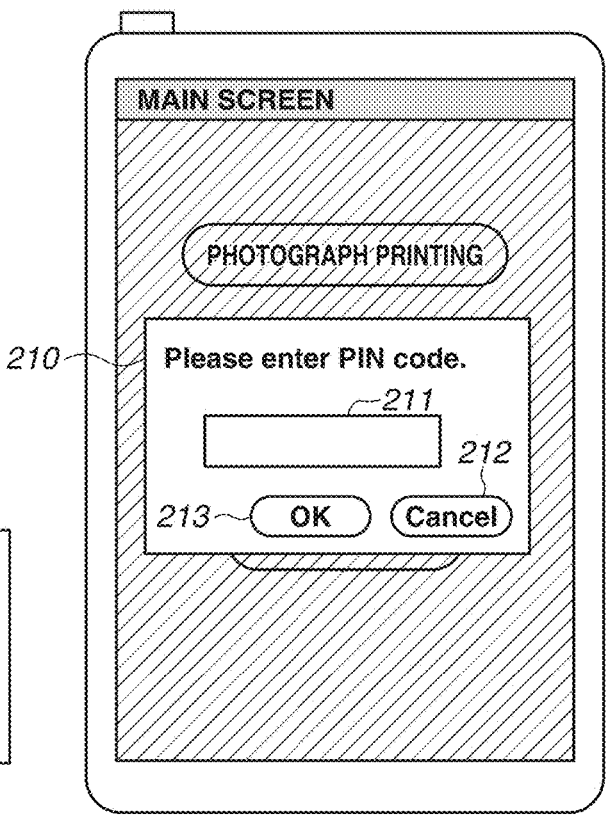

After transmitting the pairing request, the information processing apparatus 101 displays, on the display unit 108, a PIN code input screen 210, such as that illustrated in FIG. 6B. A PIN code input region 211 for receiving inputting of a PIN code 201 performed by the user is displayed on the PIN code input screen 210. An OK button 213 for transmitting the input PIN code 201 to the communication apparatus 151 and a Cancel button 212 for canceling the pairing processing are also displayed on the PIN code input screen 210.

In step S1005, when the OK button 213 is pressed by the user in a state in which the PIN code 201 is input to the PIN code input region 211, the information processing apparatus 101 transmits information including the input PIN code 201 to the communication apparatus 151.

The communication apparatus 151 determines whether the PIN code 201 included in the received information matches the PIN code 201 displayed on the PIN code display screen 200. When it is determined that they match each other, the communication apparatus 151 enables the information processing apparatus 101 to perform pairing. Specifically, the communication apparatus 151 exchanges a link key generated by a predetermined method based on the PIN code 201 with the information processing apparatus 101 using the Security Manager Protocol (SMP) of the Bluetooth® Low Energy standard. The exchanged link key is stored in both a storage region (for example, the ROM 104) included in the information processing apparatus 101 and a storage region (for example, the ROM 152) included in the communication apparatus 151. With this, pairing between the information processing apparatus 101 and the communication apparatus 151 is completed.

Upon completion of pairing, the information processing apparatus 101 stores a flag indicating that pairing is complete. When acquiring information that can be acquired only in a case where pairing with the communication apparatus 151 is complete, the information processing apparatus 101 determines whether pairing between the information processing apparatus 101 and the communication apparatus 151 is complete, based on the stored flag. Checking of the flag can be performed by the printing application making an inquiry to the OS. When the information processing apparatus 101 confirms that pairing with the communication apparatus 151 is complete, reading and writing of information with higher security level can be performed via GATT communication between the information processing apparatus 101 and the communication apparatus 151. With this, after once completing pairing with the communication apparatus 151, the information processing apparatus 101 can then perform GATT communication with enhanced security with respect to the communication apparatus 151 without inputting of a PIN code performed by the user.

While, in the above description, a configuration in which the user inputs the PIN code 201 displayed on the PIN code display screen 200 to the PIN code input region 211 has been described, the present exemplary embodiment is not limited to this configuration. For example, a configuration in which the PIN code 201 is fixed information (information that cannot be optionally changed by the user) and is stored in the information processing apparatus 101 in conjunction with installation of the printing application, so that the PIN code 201 is communicated to the communication apparatus 151 without any inputting performed by the user, can be employed. The timing at which pairing processing is started is also not limited to the above-mentioned configuration, but can be, for example, the timing at which the user issues an instruction for printing via the printing application or the timing before GATT communication is performed.

In the present exemplary embodiment, the state in which "pairing is complete" refers to a state in which, even at the time of connection after setting processing of pairing (a procedure in which a one-time common security encryption key is generated), encrypted connection can be established without the setting procedure of pairing being re-performed. In other words, "pairing" in the present exemplary embodiment is assumed to represent processing including "bonding", in which generation and exchange of a permanent security encryption key are performed. The state in which "pairing is complete" is a concept indicating a state in which, after completion of bonding, storing an encryption key in both apparatuses enables encryption reestablishment in which a secure connection is reestablished with use of the encryption key.

<Display Control Concerning Error in Information Processing Apparatus 101>

Next, processing for displaying error information about the communication apparatus 151 on the display unit 108 of the information processing apparatus 101 is described.

When activating a specific application stored in, for example, the ROM 104 or the external storage device 106, the information processing apparatus 101 performs display processing of apparatus status. The specific application is an application for performing setting of an access point for a connection destination of the communication apparatus 151, for checking the status of the communication apparatus 151 and transmitting a notification concerning the apparatus status or error information, or for instructing the communication apparatus 151 to perform processing. In the present exemplary embodiment, the above-mentioned printing application is described as an example of the specific application. The printing application can include another function besides the printing function and the function of checking the status of the communication apparatus 151. For example, in a case where the communication apparatus 151 includes a scanning function for an original (this scanning function for an original is an image reading function and is different from a scanning function for advertising information in Bluetooth® Low Energy communication), the printing application can include a function causing an original set on the communication apparatus 151 to be scanned. The printing application can also include, for example, a function to perform another setting of the communication apparatus 151.

FIGS. 5A and 5B each illustrate an example of a screen that is displayed on the display unit 108 after the printing application is activated. The user can use the functions included in the communication apparatus 151 or check the status of the communication apparatus 151 via a start screen 801, such as that illustrated in FIG. 5A. When one of objects (displayed items) in the start screen 801 is selected, the information processing apparatus 101 detects the selected object and then performs processing corresponding to each selected object. In the present exemplary embodiment, the start screen 801 includes, as objects for causing the communication apparatus 151 to perform respective types of operations, a photograph printing button 802, a scanning button 803 for an original, and a checking button 804 for the status of the communication apparatus 151. The start screen 801 also includes an end button 805 for ending the printing application. As illustrated in FIG. 5B, the start screen 801 also includes a status display region 806 indicating that the communication apparatus 151 is in an error state.

When the CPU 103 detects that the printing application has been activated, the information processing apparatus 101 enters into a scanning state, which is a state of being able to receive advertising information. In conjunction with the activation of the printing application, the start screen 801 is displayed on the display unit 108. The timing of entry into the scanning state is not limited to the above-mentioned timing. When detecting a predetermined operation performed on the start screen 801 displayed on the display unit 108 (for example, pressing of the button 804 for checking the status of the communication apparatus 151), the information processing apparatus 101 can enter into the scanning state, which is a state of being able to receive advertising information.

In the following description, the communication apparatus 151 functions as an advertiser, which transmits advertising information at predetermined intervals. The information processing apparatus 101 functions as a scanner, which waits for advertising information transmitted from an advertiser in the vicinity. Specifically, as described with reference to FIG. 13, first, the short-range wireless communication unit 157 of the communication apparatus 151 transmits advertising information. The information processing apparatus 101 can recognize the presence of the communication apparatus 151 by receiving the transmitted advertising information. Then, in the present exemplary embodiment, when detecting that the short-range wireless communication unit 110 has received the advertising information, the CPU 103 starts display processing of apparatus status.

FIG. 7 is a flowchart illustrating a control method for the information processing apparatus 101 and, particularly, illustrating a flow in which, when an error occurs in the communication apparatus 151, a notification indicating that an error is occurring is displayed on the display unit 108 of the information processing apparatus 101. The flowchart illustrated in FIG. 7 is implemented, for example, by the CPU 103 reading and loading a program stored in, for example, the ROM 104 or the external storage device 106 onto the RAM 105 and executing the program.

First, in step S101, the CPU 103 determines whether the received advertising information is advertising information transmitted from the short-range wireless communication unit 157 of the communication apparatus 151, which is a communication apparatus serving as a connection target of the printing application. Specifically, in addition to whether the short-range wireless communication unit 110 has received advertising information, the CPU 103 checks identification information (for example, a Bluetooth® address) about the communication apparatus 151 included in the received advertising information. In other words, the CPU 103 determines whether identification information indicating the communication apparatus 151 serving as a connection target of the printing application is included in the received advertising information. In the following description, the communication apparatus 151 is assumed to be a communication apparatus serving as a connection target of the printing application.

If the short-range wireless communication unit 110 has received advertising information transmitted from the communication apparatus 151 (YES in step S101), the CPU 103 then performs processing in step S102. If the short-range wireless communication unit 110 has not received advertising information transmitted from the communication apparatus 151 (NO in step S101), the CPU 103 re-performs processing in step S101.

In step S102, the CPU 103 starts processing for GATT communication based on the received advertising information. Specifically, the CPU 103 transmits a start request for GATT communication (a connection request) to the communication apparatus 151 based on the identification information indicating the communication apparatus 151 included in the advertising information received in step S101. When the start request for GATT communication is accepted by the communication apparatus 151, GATT communication is started between the communication apparatus 151 and the information processing apparatus 101. In the present exemplary embodiment, the communication apparatus 151 serves as a slave side in GATT communication, and the information processing apparatus 101 serves as a master side in GATT communication.

In step S103, the CPU 103 transmits a request for status information to the communication apparatus 151 via GATT communication. The status information is information concerning the status of the communication apparatus 151 and is assumed to include information indicating whether the communication apparatus 151 is in an error state (an error occurrence flag indicating whether an error is occurring in the communication apparatus 151). The status information is not limited to this, but can include, for example, information indicating a state in which setting, such as paper setting, has been changed, information indicating a pre-error stage, such as information concerning the remaining amount of ink, or information indicating a state in which a message has been transmitted to the communication apparatus 151. Examples of the message to be transmitted to the communication apparatus 151 include a notification of updating information, such as "firmware updating available".

Next, in step S104, the CPU 103 determines whether the short-range wireless communication unit 110 has received status information transmitted from the short-range wireless communication unit 157 of the communication apparatus 151 via GATT communication. Specifically, the CPU 103 determines whether the information received by the short-range wireless communication unit 110 has been received as a correct value as status information. If the short-range wireless communication unit 110 has received the status information (YES in step S104), the CPU 103 advances the processing to step S105. If the short-range wireless communication unit 110 has not received the status information (NO in step S104), the CPU 103 then performs processing in step S108.

In step S105, the CPU 103 determines whether the communication apparatus 151 is in an error state based on the status information received by the short-range wireless communication unit 110. Specifically, the CPU 103 determines whether error occurrence flag information included in the received status information is a value indicating that the communication apparatus 151 is in an error state. For example, in a case where the error occurrence flag indicates "1", the CPU 103 determines that the error occurrence flag is a value indicating an error state. When, in step S105, determining that the communication apparatus 151 is in an error state (YES in step S105), the CPU 103 advances the processing to step S106. When, in step S105, determining that the communication apparatus 151 is not in an error state (NO in step S105), the CPU 103 advances the processing to step S107. For example, in a case where the error occurrence flag indicates "0", the CPU 103 determines that the error occurrence flag is not a value indicating an error state, i.e., the communication apparatus 151 is not in an error state.

In step S106, the CPU 103 controls displaying of an error state, such as that indicated in the status display region 806 illustrated in FIG. 5B, on the display screen of the printing application on the display unit 108, and then advances the processing to step S108. Since the error occurrence flag information is information indicating whether the communication apparatus 151 is in an error state, the information displayed in step S106 is not detailed information, such as the type of an error, but a notification only indicating that an error is occurring, as illustrated in FIG. 5B.

In step S107, the CPU 103 hides an error occurrence notification, such as that illustrated in FIG. 5B, on the display screen of the printing application on the display unit 108, and then advances the processing to step S108. In other words, the error occurrence notification is not displayed.

In step S108, the CPU 103 ends GATT communication with the communication apparatus 151. The timing at which to disconnect GATT communication is not limited to this, but can be, for example, after receipt of the status information in step S104.

In step S109, the CPU 103 determines whether the start screen 801 is being displayed on the printing application screen on the display unit 108. If the start screen 801 is being displayed on the printing application screen on the display unit 108 (YES in step S109), the CPU 103 re-performs processing in step S102. If the start screen 801 is not being displayed on the printing application screen on the display unit 108 (NO in step S109), the CPU 103 ends the processing for status display. While, in step S109, whether to repeat GATT communication is determined based on whether the start screen 801 is being displayed in the printing application screen on the display unit 108, the present exemplary embodiment is not limited to this. For example, it can be determined based on whether the printing application is in operation.

With the above-described flow performed, the user can recognize that the communication apparatus 151 is in an error state, based on information displayed on the display unit 108 of the information processing apparatus 101.

Figure 8:
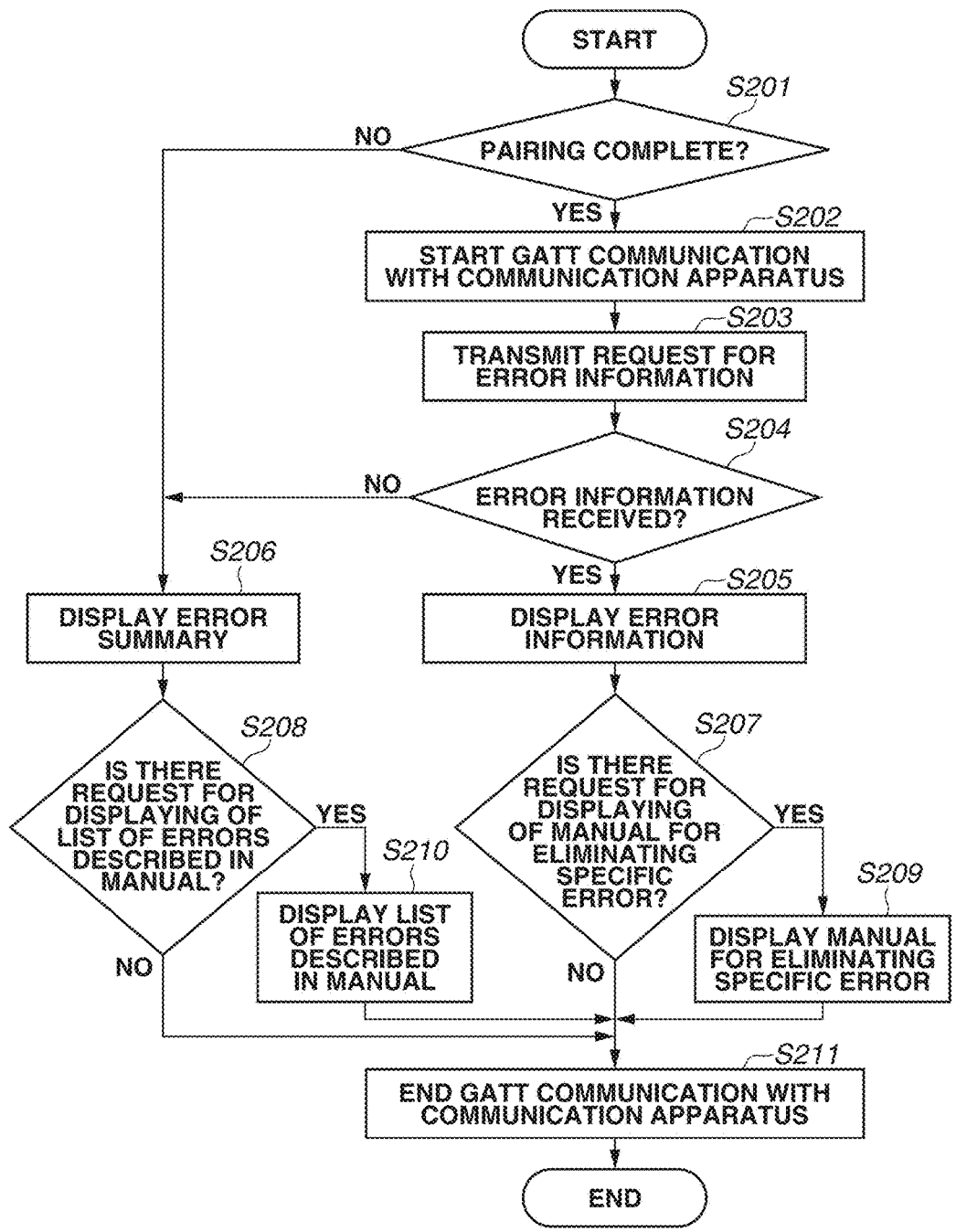
FIG. 8 is a flowchart illustrating error information acquisition processing which the information processing apparatus performs in the first exemplary embodiment.

Next, a flow in which the information processing apparatus 101 issues a notification of a method for eliminating an error occurring in the communication apparatus 151 is described with reference to FIG. 8. FIG. 8 is a flowchart illustrating processing in which, when it is determined by the processing illustrated in FIG. 7 that the communication apparatus 151 is in an error state, the information processing apparatus 101 acquires detailed information about the error. According to the processing illustrated in FIG. 7, first, the user can recognize only the presence or absence of occurrence of an error. According to the processing illustrated in FIG. 8, when wanting to know additional detailed error contents, the user can recognize details of the error and a method for eliminating the error. A request for error detailed information from the information processing apparatus 101 to the communication apparatus 151 is performed based on the user operation.

The processing illustrated in FIG. 8 is started, for example, when, while the status display region 806 indicates that the communication apparatus 151 is in an error state as illustrated in FIG. 5B, an operation such as pressing of the checking button 804 for the status of the communication apparatus 151 or pressing of the status display region 806 is detected. In other words, the processing illustrated in FIG. 8 is started when a request for acquisition of information concerning an error is made based on an input from the user. The flowchart illustrated in FIG. 8 is implemented, for example, by the CPU 103 reading and loading a program stored in, for example, the ROM 104 or the external storage device 106 onto the RAM 105 and executing the program.

First, in step S201, the CPU 103 determines whether pairing of the information processing apparatus 101 with the communication apparatus 151 is complete. If pairing with the communication apparatus 151 is complete (YES in step S201), the CPU 103 advances the processing to step S202. If pairing with the communication apparatus 151 is not complete (NO in step S201), the CPU 103 advances the processing to step S206. As a method for determining whether pairing is complete, the CPU 103 can check a flag stored after completion of pairing setting and indicating that pairing is complete. As a method for checking the flag, the CPU 103 can directly check the stored flag or check the stored flag via the OS. In a case where, as a result of checking of the flag, the flag indicating that pairing is complete is set, the information processing apparatus 101 determines that pairing is complete.

While, when it is determined that pairing is not complete, the processing proceeds to step S206, the present exemplary embodiment is not limited to this. For example, when it is determined that pairing is not complete, the CPU 103 can advance the processing to processing for performing pairing with the communication apparatus 151. In this case, a configuration in which the CPU 103 displays, on the display unit 108, a screen concerning pairing, such as a setting screen for performing pairing or a confirmation screen for confirming whether to perform pairing, can be employed.

In step S202, the CPU 103 starts processing for GATT communication based on the advertising information received by the CPU 103 in the processing illustrated in FIG. 7. Specifically, the CPU 103 transmits a start request for GATT communication to the communication apparatus 151 based on the identification information indicating the communication apparatus 151 included in the advertising information received in step S101. When a connection request for GATT communication is accepted by the communication apparatus 151, a connection establishment for GATT communication is performed between the communication apparatus 151 and the information processing apparatus 101. Since this GATT communication is GATT communication performed in a state in which pairing is complete, an encrypted connection is established, so that reading and writing of more secure information becomes possible. In other words, in the present exemplary embodiment, the information processing apparatus 101 acquires, as secure information, detailed information about an error from the communication apparatus 151.

In step S203, the CPU 103 transmits a request for detailed information about an error to the communication apparatus 151 via GATT communication.

In step S204, the CPU 103 determines whether the short-range wireless communication unit 110 has received error detailed information transmitted from the short-range wireless communication unit 157 of the communication apparatus 151 via GATT communication. If the short-range wireless communication unit 110 has received the error detailed information (YES in step S204), the CPU 103 performs processing in step S205. Specifically, the CPU 103 determines whether the information received by the short-range wireless communication unit 110 has been acquired as a correct value as error detailed information. If the short-range wireless communication unit 110 has not received the error detailed information (NO in step S204), the CPU 103 then performs processing in step S206. The error detailed information as acquired here is information about the type of an error occurring in the communication apparatus 151. Specifically, the error detailed information includes, for example, error identification information indicating the type of an error and link information such as a Uniform Resource Locator (URL) of a Web manual in which an elimination method for each type of error is described. In a case where the communication apparatus 151 is not in an error state, identification information indicating a normal status is acquired.

Figure 9A:
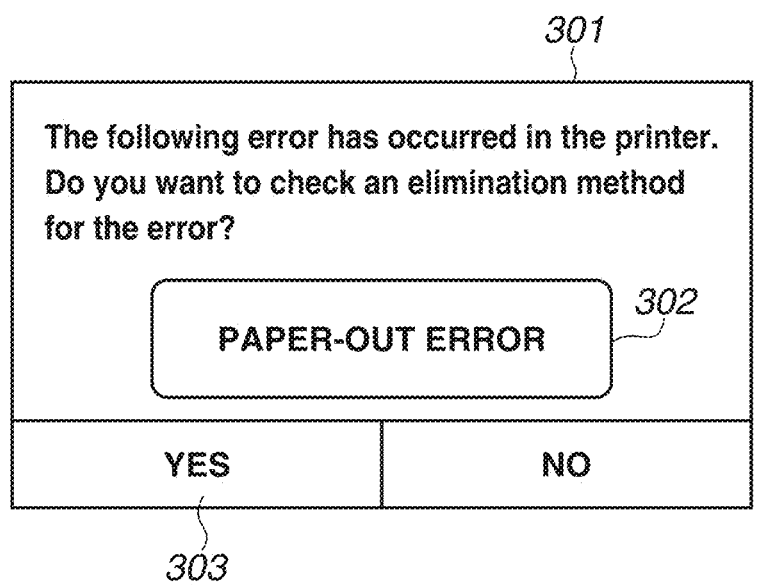
FIGS. 9A and 9B are schematic diagrams each illustrating a display screen enabling the user to select whether to check an error elimination method.

In step S205, the CPU 103 controls displaying of error detailed information, such as that illustrated in FIG. 9A, on the display screen of the printing application on the display unit 108 based on the acquired error detailed information. In displaying the error detailed information illustrated in FIG. 9A, a sentence stating that an error is occurring in the communication apparatus 151 and a sentence asking whether to check an elimination method for the error are displayed in a display area 301. A display area 302 is used to perform displaying particular detailed information of an error (in this case, the type of an error) based on the error detailed information acquired via GATT communication. While a specific error type is displayed with characters as the detailed information about an error, number information, such as an error code number or a support number, corresponding to a specific error can be displayed as the detailed information about an error in the present exemplary embodiment. Options whether to check a method for eliminating a specific error are displayed in a display area 303. The specific error is, specifically, an error displayed in the display area 302.

In step S207, the CPU 103 determines whether there is a request for displaying of a manual in which a method for eliminating a specific error is described, i.e., whether to display an elimination manual. Specifically, in a case where the user has selected an option to check an elimination method in the display area 303 illustrated in FIG. 9A, the CPU 103 determines that there is a request for displaying of the manual (YES in step S207), and then advances the processing to step S209. If the user has selected an option not to check an elimination method in the display area 303 (NO in step S207), the CPU 103 advances the processing to step S211.

Figure 12A:
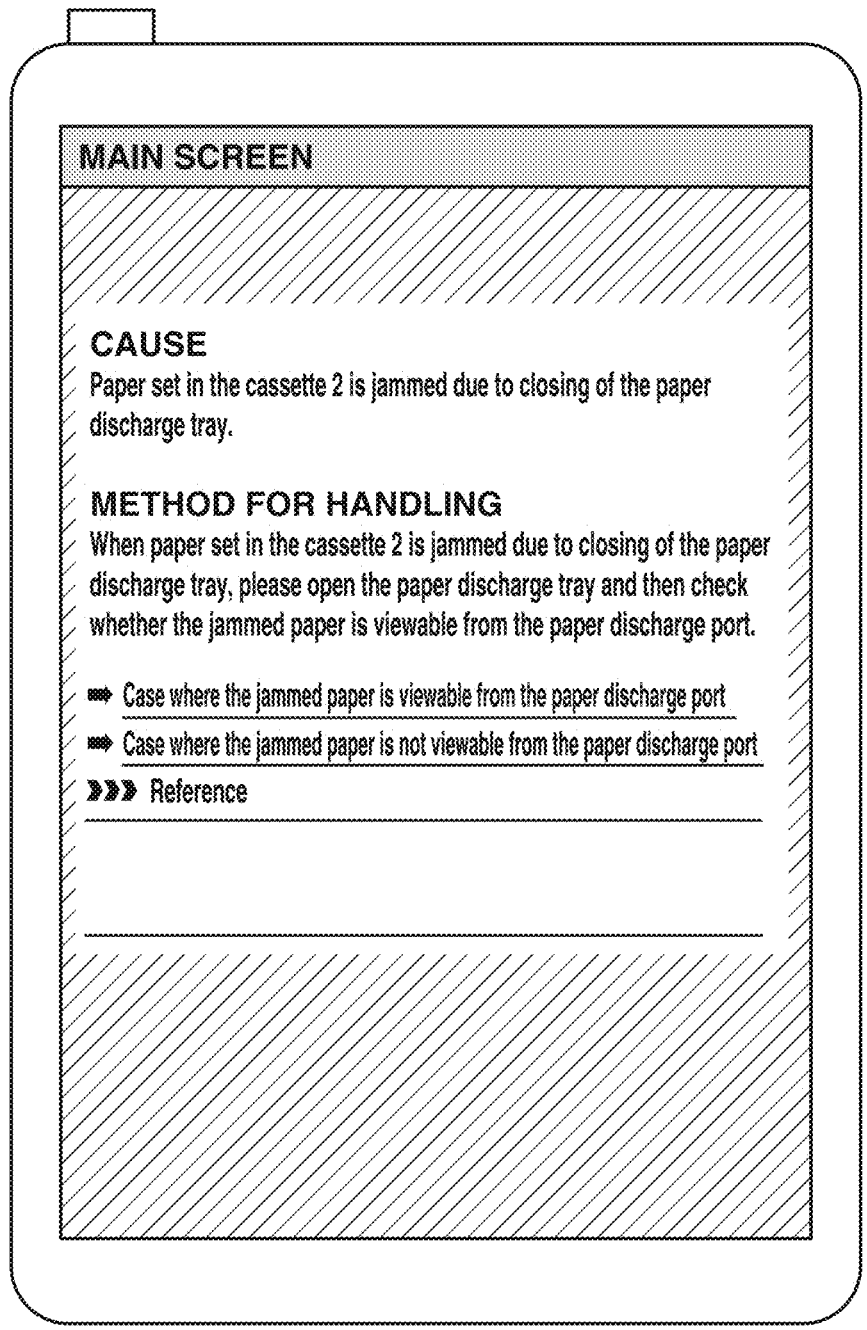
FIGS. 12A and 12B are schematic diagrams each illustrating a display screen in which information for eliminating an error is displayed.

In step S209, the CPU 103 controls displaying of the manual in which a method for eliminating a specific error is described on the screen on the display unit 108, and then advances the processing to step S211. Displaying of the manual is performed using a web browser installed on the information processing apparatus 101. An example of a specific display screen is illustrated in FIG. 12A. Referring to FIG. 12A, a screen of the Web manual in which a cause for occurrence of an error and the content of the error are described as more detailed information about the error and a specific method for handling is described as information for eliminating the error is displayed.

With regard to a specific display method, when error identification information for each error type is acquired as the detailed information about an error, the information processing apparatus 101 connects to the Internet via, for example, an access point and then acquires a resource of the Web manual via a web browser. Then, the CPU 103 displays the Web manual on the screen on the display unit 108, thus implementing the display method. Specifically, the CPU 103 generates the URL of a Web manual in which a method for eliminating the error is described using the error identification information, and then displays the Web manual located at the generated URL on the display unit 108. The display method can be implemented by a method other than the method of generating a URL. Specifically, a table in which error identification information and a URL of the Web manual are stored in association with each other is previously prepared in a storage region of the information processing apparatus 101, so that the URL of an intended Web manual can be acquired. A method of acquiring the URL itself of a web browser as the detailed information about an error can be employed.

The display method is not limited to a method of using a web browser, but control that displays a Web manual in an application, such as Web View, can be used. The display method is not limited to the use of a Web manual, and, for example, a manual stored in a storage region (for example, the ROM 104) included in the information processing apparatus 101 or a storage region (for example, the ROM 152) included in the communication apparatus 151 can be read out and displayed.

Figure 9B:
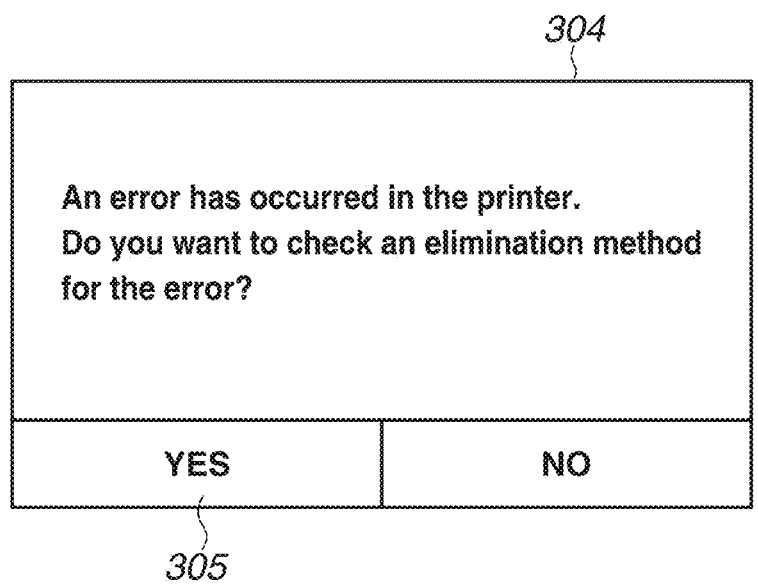

In step S206, the CPU 103 displays a screen illustrated in FIG. 9B. Processing in step S206 is performed in a case where it is determined in step S201 that pairing of the information processing apparatus 101 with the communication apparatus 151 is not complete and in a case where it is determined in step S204 that the detailed information about an error has not been acquired via GATT communication. In the screen illustrated in FIG. 9B, the CPU 103 displays, in a display area 304, a sentence indicating that an error is occurring in the communication apparatus 151 and a sentence asking whether to check an elimination method for the error. Options whether to check an elimination method for the error are displayed in a display area 305.

In step S208, the CPU 103 determines whether there is a request for displaying of a list of errors. Specifically, the CPU 103 determines whether a user made a selection to check an elimination method for the error. In the case of step S206, since the detailed information about an error is not acquired, the details (type) of an error occurring in the communication apparatus 151 are unknown. Therefore, even if the detailed information about an error or a request for checking an elimination method is input by the user in the screen illustrated in FIG. 5B or FIG. 9B, the CPU 103 is not able to identify the error. Therefore, in a case where the detailed information about an error or a request for checking an elimination method is input, the case is treated as a case where there is a request for displaying of a list of errors. If, in step S208, it is determined that there is a request for displaying of a list of errors (YES in step S208), the CPU 103 advances the processing to step S210. If, in step S208, it is determined that there is no request for displaying of a list of errors (NO in step S208), the CPU 103 advances the processing to step S211.

Figure 12B:
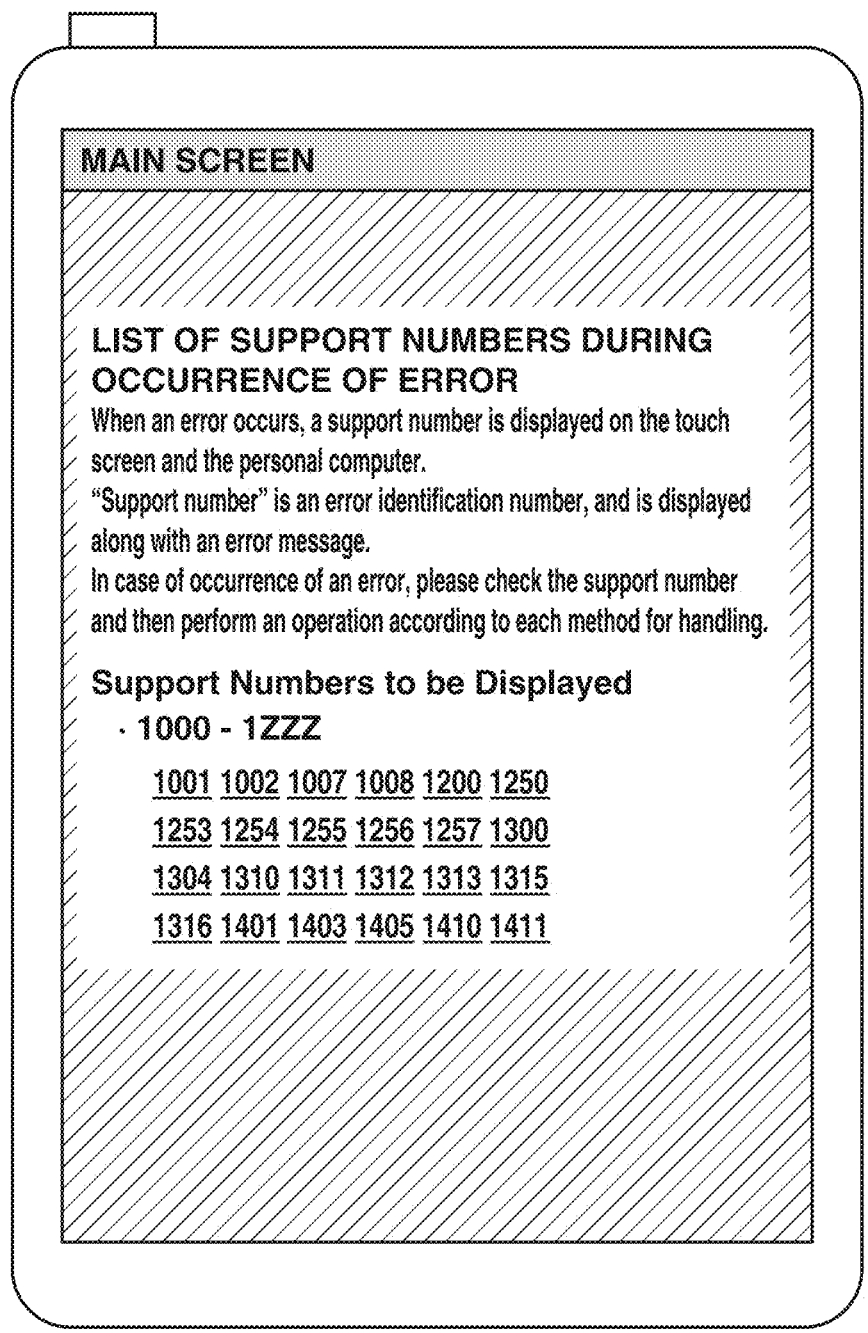

In step S210, the CPU 103 displays a screen of the Web manual in which list information about errors is displayed. As in step S209, displaying of the manual is implemented on the display unit 108 using, for example, a web browser installed on the information processing apparatus 101. Displaying of the manual is not limited to this, and, for example, a list of errors described in a manual stored in a storage region (for example, the ROM 104) included in the information processing apparatus 101 or a storage region (for example, the ROM 152) included in the communication apparatus 151 can be displayed. An example of a specific display screen is illustrated in FIG. 12B. In the screen illustrated in FIG. 12B, a list of pieces of identification information about errors is displayed as support numbers of the respective errors. These pieces of identification information are linked to respective corresponding error elimination manuals. When the user selects one of the pieces of identification information, a manual for eliminating an error corresponding to the selected identification information is displayed. Thus, as illustrated in FIG. 12A, a screen in which a method for handling is described as information for eliminating a specific error is displayed. Then, the CPU 103 advances the processing to step S211. In step S211, the CPU 103 ends GATT communication between the information processing apparatus 101 and the communication apparatus 151.

In the above-described description of the present exemplary embodiment, in a case where an instruction for acquiring information about an error is issued by the user, the information processing apparatus 101 changes a screen to be displayed on the display unit 108 based on whether pairing is complete. Specifically, in a case where pairing is complete, since the detailed information about an error, which is secure information, can be acquired from the communication apparatus 151, an error type and a cause for occurrence are displayed as the detailed information about an error. Information for eliminating an error is also displayed. Therefore, the user can recognize not only simple information indicating whether an error is occurring, but also the content of the error and an elimination method for the error via the display unit 108 of the information processing apparatus 101. In a case where pairing is not complete, since the detailed information about an error is still not acquired from the communication apparatus 151, list information about a plurality of types of errors is displayed as information related to errors. In this way, even in a case where error detailed information about the communication apparatus 151 is not acquired, the user can easily gain access to a manual screen, in which elimination methods for the respective errors are collected, from the screen of list information about errors using the information processing apparatus 101. Therefore, the user can obtain detailed information about an error occurring in the communication apparatus 151.

The present exemplary embodiment is not limited to the above-mentioned example. A step of first displaying a screen for asking whether to check an elimination method and, when a request for checking of an elimination method is made, determining whether pairing is complete can be performed. In other words, in the flow illustrated in FIG. 8, a step of determining whether pairing is complete can be performed after an instruction for checking an error elimination method is issued in the selection screen illustrated in FIG. 9B. In this case, when checking of the status is selected in the screen illustrated in FIG. 5B, a screen asking whether to check an elimination method is displayed as illustrated in FIG. 9B prior to steps S201 to S203. Then, only after checking of an elimination method is selected in such a screen, the flow in steps S201 to S203 starts. In this case, it is not necessary to re-perform steps S205 and S207.

<Control in Communication Apparatus 151>

Next, control which is performed by the communication apparatus 151 is described. First, processing which the communication apparatus 151, serving as a target for GATT communication, performs with respect to the processing that the information processing apparatus 101 performs as illustrated in FIG. 7 is described with reference to FIG. 10. FIG. 10 is a flowchart illustrating the flow of processing for information transmission which the communication apparatus 151 performs. The flowchart illustrated in FIG. 10 is implemented, for example, by the CPU 154 reading out and loading a program stored in, for example, the ROM 152 or an external storage device (not illustrated) included in the communication apparatus 151 onto the RAM 153 and executing the program. The flowchart illustrated in FIG. 10 is assumed to start when the communication apparatus 151 is powered on. The flowchart illustrated in FIG. 10 can also start, for example, when an operation, such as pressing of a predetermined button provided in the communication apparatus 151, is detected.

In step S301, the CPU 154 starts processing for broadcasting advertising information at intervals of a predetermined period using the short-range wireless communication unit 157. The term "broadcasting" as used herein refers to transmitting information to a given range without specifying a transmission destination of information. Assuming that a plurality of information processing apparatuses is present within the given range, the advertising information reaches the plurality of information processing apparatuses. Advertising information that a communication apparatus broadcasts includes identification for identifying a transmission source. Specifically, the advertising information to be transmitted here includes, in the payload 1002, identification information (for example, a Bluetooth® address) for identifying the communication apparatus 151. Checking this identification information enables determining the communication apparatus 151 serving as a connection target for the printing application installed in the information processing apparatus 101.

In step S302, the CPU 154 determines whether the short-range wireless communication unit 157 has received a start request (connection request) for GATT communication from the information processing apparatus 101. If the short-range wireless communication unit 157 has received a start request for GATT communication (YES in step S302), the CPU 154 advances the processing to step S303. If the short-range wireless communication unit 157 has not received a start request for GATT communication (NO in step S302), the CPU 154 advances the processing to step S312.

In step S312, the CPU 154 determines whether the communication apparatus 151 has been powered off. Specifically, the CPU 154 determines whether a start instruction for power-off processing has been issued by a power button included in the communication apparatus 151 being pressed. If the communication apparatus 151 has not been powered off (NO in step S312), the CPU 154 then re-performs processing in step S301. If the communication apparatus 151 has been powered off (YES in step S312), the CPU 154 stops transmission of the advertising information and ends the processing.

In step S303, to perform GATT communication, the CPU 154 temporarily stops transmission of the advertising information.

In step S304, the CPU 154 starts GATT communication with the information processing apparatus 101 via the short-range wireless communication unit 157. Thus, a connection establishment of GATT communication is performed between the communication apparatus 151 and the information processing apparatus 101.

In step S305, the CPU 154 determines whether a request for status information acquisition has been received via GATT communication. If the request for status information acquisition has been received (YES in step S305), the CPU 154 advances the processing to step S306. If the request for status information acquisition has not been received (NO in step S305), the CPU 154 advances the processing to step S307.

In step S307, the CPU 154 determines whether a predetermined time has elapsed from the start of GATT communication (time-out has occurred). If time-out has not occurred (NO in step S307), the CPU 154 then re-performs processing in step S305. If time-out has occurred (YES in step S307), the CPU 154 advances the processing to step S310.

In step S306, the CPU 154 determines whether an error of some type is occurring in the communication apparatus 151. The error refers to a state in which the communication apparatus 151 is unable to perform processing. For example, in a case where the communication apparatus 151 is a printing apparatus, the error refers to, for example, a state in which the remaining amount of recording agent, such as ink, runs out in the process of performing print processing, a state in which the remaining amount of a recording medium, such as paper, is insufficient, or a state in which a recording medium is jamming. If an error is occurring in the communication apparatus 151 (YES in step S306), the CPU 154 advances the processing to step S308. In the stage of step S306, the CPU 154 determines whether an error is occurring in the communication apparatus 151, as well as acquires information about the details of the error (the type of the error). The detailed information about an error is stored in a storage region of the communication apparatus 151.

In step S308, the CPU 154 transmits, to the information processing apparatus 101, status information including information indicating that an error is occurring in the communication apparatus 151 (status information indicating that the communication apparatus 151 is in an error state) via GATT communication. While, in step S306, the communication apparatus 151 recognizes the details of an error, it is desirable that, in step S308, the status information does not include the detailed information about an error, but includes information only indicating whether an error is occurring (an error occurrence flag). If no error is occurring in the communication apparatus 151 (NO in step S306), the CPU 154 advances the processing to step S309.

In step S309, the CPU 154 transmits, to the information processing apparatus 101, status information including information indicating that no error is occurring (status information indicating that the communication apparatus 151 is in a normal state) via GATT communication.

In step S310, the CPU 154 ends GATT communication between the information processing apparatus 101 and the communication apparatus 151, and then advances the processing to step S311. In step S311, the CPU 154 resumes transmission of advertising information.

As described, the communication apparatus 151 based on the present exemplary embodiment transmits the presence or absence of occurrence of an error (an error occurrence flag) to the information processing apparatus 101 via GATT communication. This enables the user to recognize, via the information processing apparatus 101, that the communication apparatus 151 is in an error state. The error occurrence flag can be included in advertising information and then transmitted from the communication apparatus 151. However, rather than that, transmitting the error occurrence flag via GATT communication, which does not require the communication apparatus 151 to switch advertising information based on the presence or absence of occurrence of an error, is more desirable because processing for switching advertising information is not necessary. Specifically, stopping of transmission of advertising information or generation and starting of transmission of advertising information that has different information based on the presence or absence of occurrence of an error can be made unnecessary.

While, in the present exemplary embodiment, the communication apparatus 151 starts transmission of advertising information after being powered on, the present exemplary embodiment is not limited to this. Specifically, for example, a button used to issue an instruction for starting transmission of advertising information can be provided on the communication apparatus 151 and, after detecting pressing of the button by the user, the communication apparatus 151 can start transmission of advertising information.

Next, a flow for the communication apparatus 151 to transmit detailed information about an error is described. Specifically, processing that the communication apparatus 151, serving as a target for GATT communication, performs with respect to the processing which the information processing apparatus 101 performs as illustrated in FIG. 8 is described with reference to FIG. 11. FIG. 11 is a flowchart illustrating the flow of processing for information transmission that the communication apparatus 151 performs. The flowchart illustrated in FIG. 11 is implemented, for example, by the CPU 154 reading out and loading a program stored in, for example, the ROM 152 or an external storage device (not illustrated) included in the communication apparatus 151 onto the RAM 153 and executing the program. The flowchart illustrated in FIG. 11 is assumed to start when the communication apparatus 151 is powered on. The flowchart illustrated in FIG. 11 can also start, for example, when an operation, such as pressing of a predetermined button provided in the communication apparatus 151, is detected.

The processing of steps S401, S402, and S411 are similar to the processing in steps S301, S302, and S312, respectively, and are, therefore, omitted from description herein.

In step S403, the CPU 154 determines whether the information processing apparatus 101, which is a transmission source of a start request for GATT communication (a connection request), is an apparatus pairing of which is complete with the communication apparatus 151. If the information processing apparatus 101 is an apparatus pairing of which is complete (YES in step S403), the CPU 154 advances the processing to step S404. If the information processing apparatus 101 is not an apparatus pairing of which is complete (NO in step S403), the CPU 154 advances the processing to step S411.

The processing of steps S404 and S405 are similar to the processing in steps S303 and S304, and are, therefore, omitted from description herein.

In step S406, the CPU 154 determines whether a request for acquisition of error detailed information has been received via GATT communication. If the request for acquisition of error detailed information has been received (YES in step S406), the CPU 154 advances the processing to step S408. If the request for acquisition of error detailed information has not been received (NO in step S406), the CPU 154 advances the processing to step S407.

In step S407, the CPU 154 determines whether a predetermined time has elapsed from the start of GATT communication (time-out has occurred). If time-out has not occurred (NO in step S407), the CPU 154 then re-performs processing in step S406. If time-out has occurred (YES in step S407), the CPU 154 advances the processing to step S410.

In step S408, the CPU 154 transmits, to the information processing apparatus 101, status information including detailed information about an error occurring in the communication apparatus 151 via GATT communication. The error detailed information to be transmitted in step S408 is information acquired in step S306 illustrated in FIG. 10 and stored in a storage region included in the communication apparatus 151. Specifically, error identification information indicating the type of an error is transmitted. Link information, such as the URL of a Web manual, in which an elimination method for each error type is described can be transmitted instead.

In step S409, the CPU 154 ends GATT communication between the information processing apparatus 101 and the communication apparatus 151, and, in step S410, the CPU 154 resumes transmission of advertising information.

As described, the communication apparatus 151 according to the present exemplary embodiment transmits, to a destination (the information processing apparatus 101) pairing of which is complete, detailed information about an error via GATT communication, which is secure only in a case where pairing is complete. This enables error detailed information about the communication apparatus 151 to be transmitted only to the information processing apparatus 101 in which security is ensured.

While, in the present exemplary embodiment, the communication apparatus 151 starts transmission of advertising information after being powered on, the present exemplary embodiment is not limited to this. For example, a button used to issue an instruction for starting transmission of advertising information can be provided on the communication apparatus 151. The communication apparatus 151 can start transmission of advertising information after detecting the button has been pressed by the user. This enables error detailed information about the communication apparatus 151 to be transmitted to the information processing apparatus 101 only with respect to the user who wants to refer to the error detailed information via the information processing apparatus 101.

As described, in the present exemplary embodiment, according to the processing illustrated in FIG. 7 and FIG. 10, when it is determined that the communication apparatus 151 is in an error state, the communication apparatus 151 transmits, to the information processing apparatus 101, an error occurrence flag indicating that the communication apparatus 151 is in an error state via GATT communication. The information processing apparatus 101 provides a display indicating that the communication apparatus 151 is in an error state, based on the received error occurrence flag. Then, in a case where an instruction to acquire more detailed error information is issued in response to the user input, according to the processing illustrated in FIG. 8 and FIG. 11, the information processing apparatus 101 determines whether pairing with the communication apparatus 151 is complete. In a case where pairing is complete, the information processing apparatus 101 makes a request for acquisition of detailed information about an error to the communication apparatus 151. The communication apparatus 151 transmits detailed information about an error to the information processing apparatus 101 in response to the request, and, when having acquired the detailed information about an error, the information processing apparatus 101 provides guidance via a manual screen in which information for eliminating a specific error is illustrated. This enables the user to readily recognize the error detailed information about the communication apparatus 151 or the error elimination method via the display unit 108 of the information processing apparatus 101.

When pairing between the information processing apparatus 101 and the communication apparatus 151 is not complete and the information processing apparatus 101 has not acquired the detailed information about an error, the information processing apparatus 101 provides guidance via a manual screen in which list information about errors is collected. Even if the error detailed information about the communication apparatus 151 has not been acquired, the user can easily gain access to a manual in which elimination methods for respective errors are illustrated from the screen in which list information about errors is collected, via the information processing apparatus 101. Accordingly, the user can recognize detailed information about an error occurring in the communication apparatus 151.

The functions of the present exemplary embodiment are particularly effective in a case where the display unit of the communication apparatus 151 is small or the communication apparatus 151 does not have a display unit. The information processing apparatus 101 can check and acquire error detailed information or an elimination method by referring to a Web manual displayed via a web browser or a storage region, such as the ROM 104, of the information processing apparatus 101. The functions are also effective in a case where the ROM 152 of the communication apparatus 151 does not have a sufficient capacity and is unable to retain detailed error information.

While, in the above-described exemplary embodiment, the communication apparatus 151 transmits an error occurrence flag indicating the presence or absence of occurrence of an error via GATT communication, the exemplary embodiment is not limited to this. The communication apparatus 151 can transmit advertising information in which the error occurrence flag is included. Specifically, the communication apparatus 151 can generate pieces of advertising information including respective error occurrence flags including different values based on the presence or absence of occurrence of an error and switch between these pieces of advertising information to be transmitted based on the status of the communication apparatus 151. Alternatively, when detecting pressing of a button used to start transmission of advertising information, the communication apparatus 151 determines whether an error is occurring in the communication apparatus 151. If it is determined that an error is occurring, the communication apparatus 151 can start transmission of advertising information including an error occurrence flag indicating that an error is occurring. In these configurations, since information indicating that an error is occurring is broadcast with advertising information, in a case where a plurality of information processing apparatuses 101 is present in the range of broadcasting, a plurality of users can be notified of error occurrence. In a case where an error occurrence flag is included in advertising information, in GATT communication in the flows illustrated in FIG. 7 and FIG. 10 (GATT communication which is able to be performed even when pairing is not complete), the communication apparatus 151 does not need to perform transmission of an error occurrence flag.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD™), a flash memory device, a memory card, and the like.

According to exemplary embodiments of the present disclosure, an information processing apparatus can more appropriately provide a notification of information concerning, for example, an error occurring in a communication apparatus based on a communication status between the communication apparatus and the information processing apparatus.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-072370 filed Mar. 31, 2017, which is hereby incorporated by reference herein in its entirety.

What is claimed is:

1. A control method for an information processing apparatus that performs wireless communication with a communication apparatus, the control method comprising:

acquiring, via a connection established by a communication based on a Bluetooth® standard, information transmitted from the communication apparatus; and causing a display unit of the information processing apparatus to display a screen for eliminating an error occurring in the communication apparatus, wherein, in a case where the communication apparatus is in a predetermined error state, the information processing apparatus is able to acquire first predetermined information and second predetermined information from the communication apparatus via the established connection, in a first state where authentication between the communication apparatus and the information processing apparatus has been performed, wherein, in a case where the communication apparatus is in the predetermined error state, the information processing apparatus is able to acquire the first predetermined information via the established connection and is not able to acquire the second predetermined information via the established connection, in a second state where the authentication has not been performed, wherein, in a case where the second predetermined information is acquired, a screen including first information for eliminating the predetermined error state is displayed on the display unit based on the acquired second predetermined information, and, wherein in a case where the second predetermined information is not acquired, a screen including second information different from the first information is displayed on the display unit.

2. The control method according to claim 1, wherein, even in the first state, if the second predetermined information is not acquired, the screen including the second information is displayed.

3. The control method according to claim 1, further comprising:

acquiring, prior to acquiring the second predetermined information, the first predetermined information from the communication apparatus in the case where the communication apparatus is in the predetermined error state; and causing the display unit to display, based on the first predetermined information, notification indicating that the communication apparatus is in an error state.

4. The control method according to claim 1, further comprising:

acquiring, prior to acquiring the second predetermined information, the first predetermined information from the communication apparatus in the case where the communication apparatus is in the predetermined error state; and causing the display unit to display, based on the acquired first predetermined information, a screen that allows a user to perform instruction for displaying information regarding an error elimination method; and transmitting, to the communication apparatus via the established connection, a request for the second predetermined information, in a case where the user performs the instruction, wherein the second predetermined information is acquired from the communication apparatus based on the request.

5. The control method according to claim 1, wherein the screen in which the first information is included is a screen including a handling method for eliminating the predetermined error state.

6. The control method according to claim 1, wherein the screen in which the second information is included is a screen including a list of identifiers corresponding to respective errors.

7. The control method according to claim 6, wherein, in response to one identifier in the list of identifiers being selected, a screen including the first information for eliminating an error corresponding to the selected identifier is displayed.

8. The control method according to claim 1, wherein the established connection is a connection established using Generic Attribute Profile based on a Bluetooth® Low Energy standard.

9. The control method according to claim 8, wherein the information processing apparatus and the communication apparatus perform wireless communication using a different communication standard with higher-speed than the Bluetooth® Low Energy communication standard, and wherein image data is communicated using the different communication standard.

10. A control method for an information processing apparatus that performs wireless communication with a communication apparatus, the control method comprising:

acquiring, via a connection established by a communication based on a Bluetooth® standard, information transmitted from the communication apparatus; and causing a display unit of the information processing apparatus to display detailed information about an error occurring in the communication apparatus, wherein, in a case where the communication apparatus is in a predetermined error state, the information processing apparatus is able to acquire first predetermined information and second predetermined information from the communication apparatus via the established connection, in a first state where authentication between the communication apparatus and the information processing apparatus has been performed, wherein, in a case where the communication apparatus is in the predetermined error state, the information processing apparatus is able to acquire the first predetermined information via the established connection and is not able to acquire the second predetermined information via the established connection, in a second state where the authentication has not been performed, wherein, in a case where the second predetermined information is acquired, a screen including detailed information about the predetermined error state is displayed on the display unit based on the acquired second predetermined information, and wherein, in a case where the second predetermined information is not acquired, a screen in which the detailed information about the predetermined error state is not included is displayed.

11. The control method according to claim 10, wherein the established connection is a connection established using Generic Attribute Profile based on a Bluetooth® Low Energy standard.

12. The control method according to claim 11, wherein the information processing apparatus and the communication apparatus perform wireless communication using a different communication standard with higher-speed than the Bluetooth® Low Energy communication standard, and wherein image data is communicated using the different communication standard.

13. An information processing apparatus that performs wireless communication with a communication apparatus, the information processing apparatus comprising:
at least one processor causing the information processing apparatus to act as:
a first reception unit configured to acquire, via a connection established by a communication based on a Bluetooth® standard, information transmitted from the communication apparatus; and
a first display control unit configured to cause a display unit of the information processing apparatus to display a screen for eliminating an error occurring in the communication apparatus,
wherein, in a case where the communication apparatus is in a predetermined error state, the information processing apparatus is able to acquire first predetermined information and second predetermined information from the communication apparatus via the established connection, in a first state where authentication between the communication apparatus and the information processing apparatus has been performed,
wherein, in a case where the communication apparatus is in the predetermined error state, the information processing apparatus is able to acquire the first predetermined information via the established connection and is not able to acquire the second predetermined information via the established connection, in a second state where the authentication has not been performed,
wherein, in a case where the second predetermined information is acquired, the first display control unit, based on the acquired second predetermined information, causes the display unit to display a screen including first information for eliminating the predetermined error state, and,
wherein, in a case where the second predetermined information is not acquired, the first display control unit causes the display unit to display a screen including second information different from the first information for eliminating the predetermined error state.

14. The information processing apparatus according to claim 13, wherein, even in the first state, if the second predetermined information is not acquired, the first display control unit causes the display unit to display the screen including the second information.

15. The information processing apparatus according to claim 13, wherein the at least one processor further causes the information processing apparatus to act as:
a second reception unit configured to acquire, prior to acquiring the second predetermined information, the first predetermined information from the communication apparatus in the case where the communication apparatus is in the predetermined error state; and
a second display control unit configured to cause, based on the first predetermined information, the display unit to display a notification indicating that the communication apparatus is in an error state.

16. The information processing apparatus according to claim 13, wherein the at least one processor further causes the information processing apparatus to act as:
a second reception unit configured to acquire, prior to acquiring the second predetermined information, the first predetermined information from the communication apparatus in the case where the communication apparatus is in the predetermined error state; and
a second display control unit configured to cause based on the acquired first predetermined information, the display unit to display a screen that allows a user to perform instruction for displaying information regarding an error elimination method; and
a request unit configured to transmit, to the communication apparatus via the established connection, a request for the second predetermined information, in a case where the user performs the instruction,
wherein the second predetermined information is acquired from the communication apparatus based on the request.

17. The information processing apparatus according to claim 13, wherein the screen including the first information is a screen including a handling method for eliminating the predetermined error state.

18. The information processing apparatus according to claim 13, wherein the screen on which the second information is included is a screen including a list of identifiers corresponding to respective errors.

19. The information processing apparatus according to claim 18, wherein, in response to one identifier in the list of identifiers being selected, the first display control unit causes the display unit to display a screen including the first information for eliminating an error corresponding to the selected identifier.

20. The information processing apparatus according to claim 13, wherein the established connection is a connection established using Generic Attribute Profile based on a Bluetooth® Low Energy standard.

21. The information processing apparatus according to claim 20,
wherein the information processing apparatus and the communication apparatus perform wireless communication using a different communication standard with higher-speed than the Bluetooth® Low Energy communication standard, and
wherein image data is communicated using the different communication standard.

22. An information processing apparatus that performs wireless communication with a communication apparatus, the information processing apparatus comprising:
at least one processor causing the information processing apparatus to act as:
a first reception unit configured to acquire, via a connection established by a communication based on a Bluetooth® standard, information transmitted from the communication apparatus; and
a first display control unit configured to cause a display unit of the information processing apparatus to display detailed information about an error occurring in the communication apparatus,
wherein, in a case where the communication apparatus is in a predetermined error state, the information processing apparatus is able to acquire first predetermined information and second predetermined information from the communication apparatus via the established connection, in a first state where authentication between the communication apparatus and the information processing apparatus has been performed,
wherein, in a case where the communication apparatus is in the predetermined error state, the information processing apparatus is able to acquire the first predetermined information via the established connection and is not able to acquire the second predetermined information via the established connection, in a second state where the authentication has not been performed,
wherein, in a case where the second predetermined information is acquired, the first display control unit causes, based on the acquired second predetermined information, the display unit to display a screen including detailed information about the predetermined error state, and, wherein, in a case where the second predetermined information is not acquired, the first display control unit causes the display unit to display information different from the detailed information about the predetermined error state.

23. The information processing apparatus according to claim 22, wherein the established connection is a connection established using Generic Attribute Profile based on a Bluetooth® Low Energy standard.

24. The information processing apparatus according to claim 23, wherein the information processing apparatus and the communication apparatus perform wireless communication using a different communication standard with higher-speed than the Bluetooth® Low Energy communication standard, and wherein image data is communicated using the different communication standard.

* * * * *